US012690035B2

(12) United States Patent
Xiong et al.

(10) Patent No.: US 12,690,035 B2
(45) Date of Patent: Jul. 21, 2026

(54) USER EQUIPMENT CONFIGURED FOR DETERMINING DETERMINATION OF HARQ PROCESS ID FOR HIGHER CARRIER FREQUENCY WHEN SCHEDULED WITH MULTIPLE PUSCHS WITH OVERLAPPING SYMBOLS

(71) Applicant: Intel Corporation, Santa Clara, CA (US)

(72) Inventors: Gang Xiong, Portland, OR (US); Yi Wang, Santa Clara, CA (US); Yingyang Li, Santa Clara, CA (US); Daewon Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 18/558,349

(22) PCT Filed: Sep. 9, 2022

(86) PCT No.: PCT/US2022/043037
§ 371 (c)(1),
(2) Date: Oct. 31, 2023

(87) PCT Pub. No.: WO2023/048967
PCT Pub. Date: Mar. 30, 2023

(65) Prior Publication Data
US 2024/0224271 A1     Jul. 4, 2024

Related U.S. Application Data

(60) Provisional application No. 63/255,791, filed on Oct. 14, 2021, provisional application No. 63/247,110, filed on Sep. 22, 2021.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 5/1469* (2013.01); *H04W 56/0015* (2013.01); *H04W 72/232* (2023.01)

(58) Field of Classification Search
None
See application file for complete search history.

(56) References Cited

U.S. PATENT DOCUMENTS

2021/0144743 A1* 5/2021 Rastegardoost ...... H04W 72/23
2022/0210798 A1* 6/2022 Tsai ...................... H04L 5/0051
(Continued)

FOREIGN PATENT DOCUMENTS

WO     WO-2023048967 A1     3/2023

OTHER PUBLICATIONS

International Patent Office- International Search Report and Written Opinion mailed Dec. 22, 2022, from International Patent Application No. PCT/US2022/043037, 9 pages.
(Continued)

*Primary Examiner* — Gregory B Sefcheck
(74) *Attorney, Agent, or Firm* — Schwegman Lundberg & Woessner, P.A.

(57)          ABSTRACT

Various embodiments herein provide techniques for determination of hybrid automatic repeat request (HARQ) process identifier (ID). The techniques may be used, for example, for multi-transmission scheduling by a single downlink control information (DCI) and/or in higher carrier frequencies. Other embodiments may be described and claimed.

2 Claims, 15 Drawing Sheets slot

Flexible symbols with SSB transmission

(51) Int. Cl.
H04L 5/14 (2006.01)
H04W 56/00 (2009.01)
H04W 72/232 (2023.01)

(56) References Cited

U.S. PATENT DOCUMENTS

| | | | | |
|---|---|---|---|---|
| 2022/0322341 | A1* | 10/2022 | Tiirola | H04L 5/0044 |
| 2023/0039872 | A1* | 2/2023 | Khoshkholgh Dashtaki | |
| | | | | H04W 72/1268 |
| 2023/0049739 | A1* | 2/2023 | Yang | H04L 5/0055 |
| 2023/0147579 | A1* | 5/2023 | Go | H04L 1/08 |
| | | | | 370/329 |
| 2024/0224271 | A1* | 7/2024 | Xiong | H04W 56/0015 |

OTHER PUBLICATIONS

Vivo, "Further discussion on collision of RRM measurement resources with uplink transmissions in FR1 TDD," 3GPP TSG-RAN WG4 Meeting #90, R4-1901023, Agenda Item: 6.12.3.2.6, Feb. 25-Mar. 1, 2019, Athens, GR, 5 pages.

Spreadtrum Communications, "Discussion on initial access and mobility in NR-U," 3GPP TSG RAN WG1 Meeting #99, R1-1912572, Agenda Item: 7.2.2.2.2, Nov. 18-22, 2019, Reno, USA, 10 pages.

Qualcomm Incorporated, "Feature lead summary on initial access signals and channels for NR-U," 3GPP TSG RAN WG1 Meeting #99, R1-1913491, Agenda item: 7.2.2.1.1, Nov. 18-22, 2019, Reno, Nevada, US, 52 pages.

LG Electronics, "Summary #2 of PDSCH/PUSCH enhancements (Scheduling/HARQ)," 3GPP TSG RAN WG1 #106-e, R1-2108333, Agenda Item: 8.2.5, Aug. 16-27, 2021, e-Meeting, 55 pages.

Intel Corporation, "On collision of RRM measurement with UL transmission," 3GPP TSG-RAN4 Meeting #90, R4-190xxxx, Agenda item: 6.12.10, Feb. 25-Mar. 1, 2019, Athens, Greece, 5 pages.

"International Application Serial No. PCT/US2022/043037, International Preliminary Report on Patentability mailed Apr. 4, 2024".

* cited by examiner

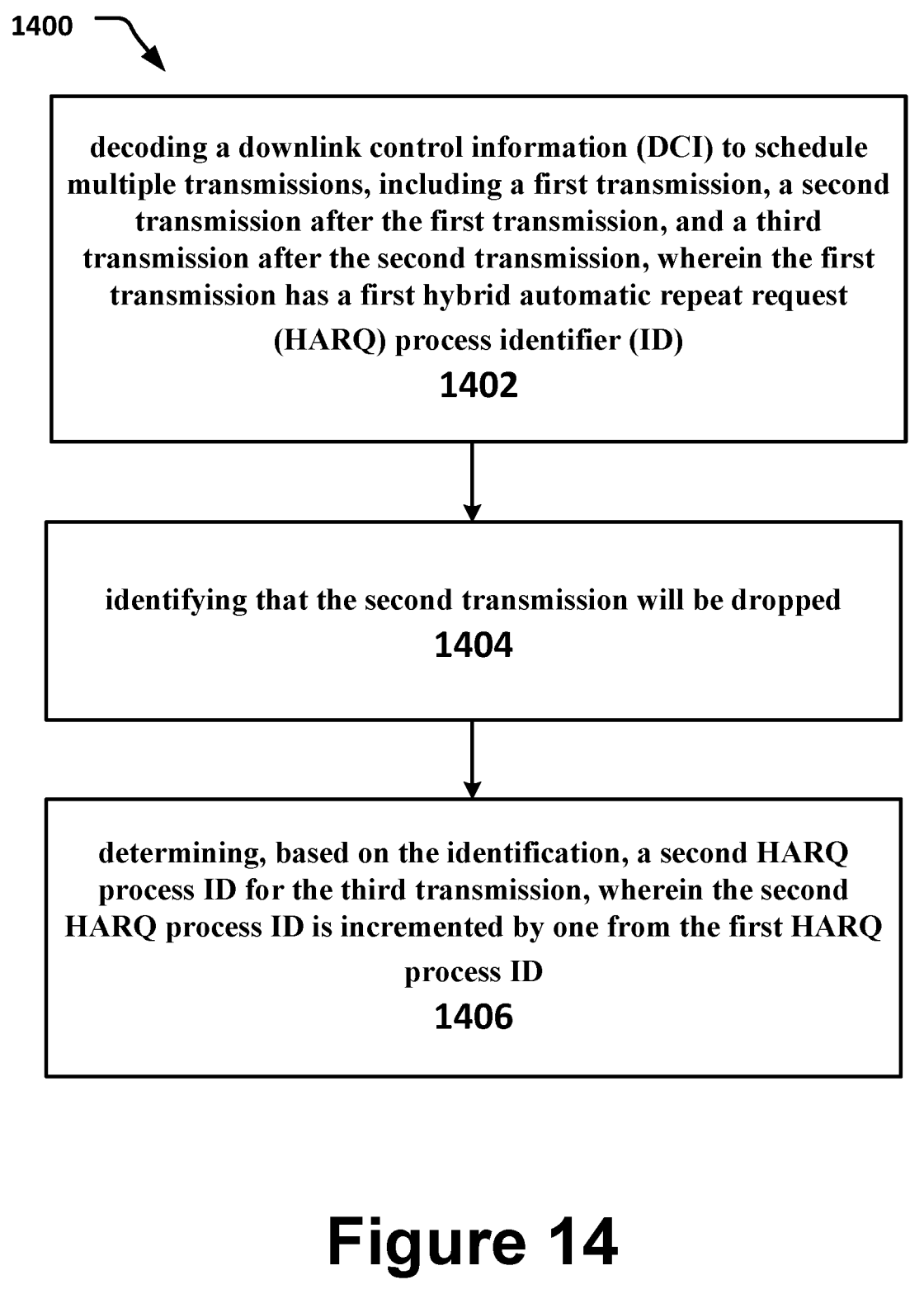

1400 decoding a downlink control information (DCI) to schedule
multiple transmissions, including a first transmission, a second
transmission after the first transmission, and a third
transmission after the second transmission, wherein the first
transmission has a first hybrid automatic repeat request
(HARQ) process identifier (ID)
1402 identifying that the second transmission will be dropped
1404 determining, based on the identification, a second HARQ
process ID for the third transmission, wherein the second
HARQ process ID is incremented by one from the first HARQ
process ID
1406

Figure 14

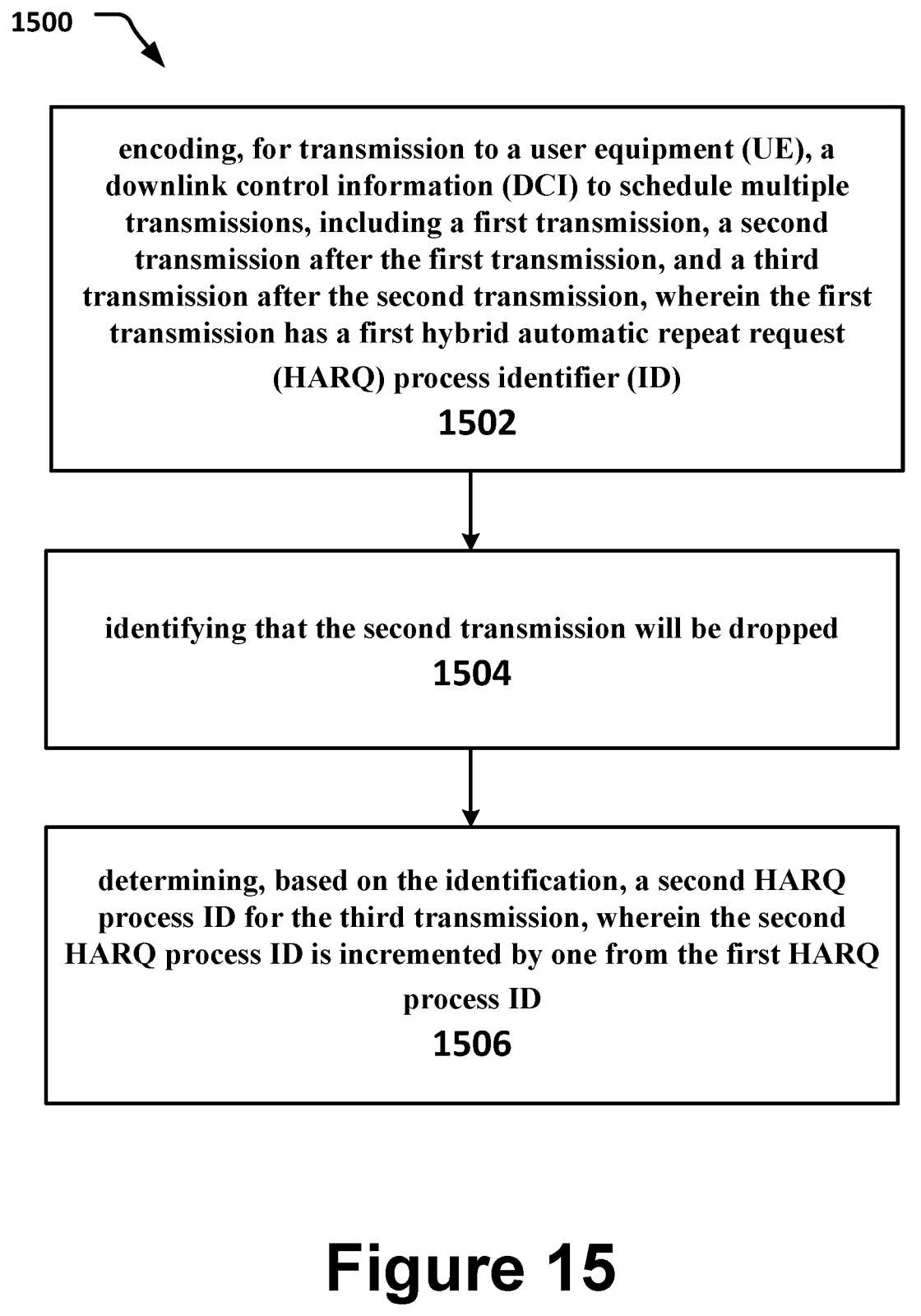

1500 encoding, for transmission to a user equipment (UE), a downlink control information (DCI) to schedule multiple transmissions, including a first transmission, a second transmission after the first transmission, and a third transmission after the second transmission, wherein the first transmission has a first hybrid automatic repeat request (HARQ) process identifier (ID)
1502 identifying that the second transmission will be dropped
1504 determining, based on the identification, a second HARQ process ID for the third transmission, wherein the second HARQ process ID is incremented by one from the first HARQ process ID
1506

Figure 15

USER EQUIPMENT CONFIGURED FOR DETERMINING DETERMINATION OF HARQ PROCESS ID FOR HIGHER CARRIER FREQUENCY WHEN SCHEDULED WITH MULTIPLE PUSCHS WITH OVERLAPPING SYMBOLS

CROSS REFERENCE TO RELATED APPLICATION

The present application is a national phase entry under 35 U.S.C. § 371 of International Application No. PCT/US2022/043037, filed Sep. 9, 2022, entitled "DETERMINATION OF HARQ PROCESS ID FOR HIGHER CARRIER FREQUENCY," which claims priority to U.S. Provisional Patent Application No. 63/247,110, which was filed Sep. 22, 2021; and to U.S. Provisional Patent Application No. 63/255,791, which was filed Oct. 14, 2021, the entire disclosures of which are hereby incorporated by reference.

FIELD

Various embodiments generally may relate to the field of wireless communications. For example, some embodiments may relate to determination of hybrid automatic repeat request (HARQ) process identifier (ID).

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

In Rel-16, multi-physical uplink shared channel (PUSCH) based scheduling was defined to allocate consecutive PUSCH transmissions so as to avoid unnecessary listen before talk (LBT) for NR unlicensed operation. Further, in Rel-17, multi-physical downlink shared channel (PDSCH) based scheduling was introduced, where one physical downlink control channel (PDCCH) can be used to schedule multiple PDSCHs or PUSCH carrying independent transport blocks (TB). This is primarily due to the fact that for system operating between 52.6 GHz and 71 GHz carrier frequency, when a large subcarrier spacing, e.g., 480 kHz or 960 kHz is used, symbol and slot duration is very short, which may pose certain constraint for scheduler implementation. In this case, multi-PDSCH and multi-PUSCH based scheduling can be employed to alleviate scheduler constraint and relax higher layer processing burden, while maintaining same peak data rate.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 14 depicts an example procedure for practicing the various embodiments discussed herein.

FIG. 15 depicts another example procedure for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
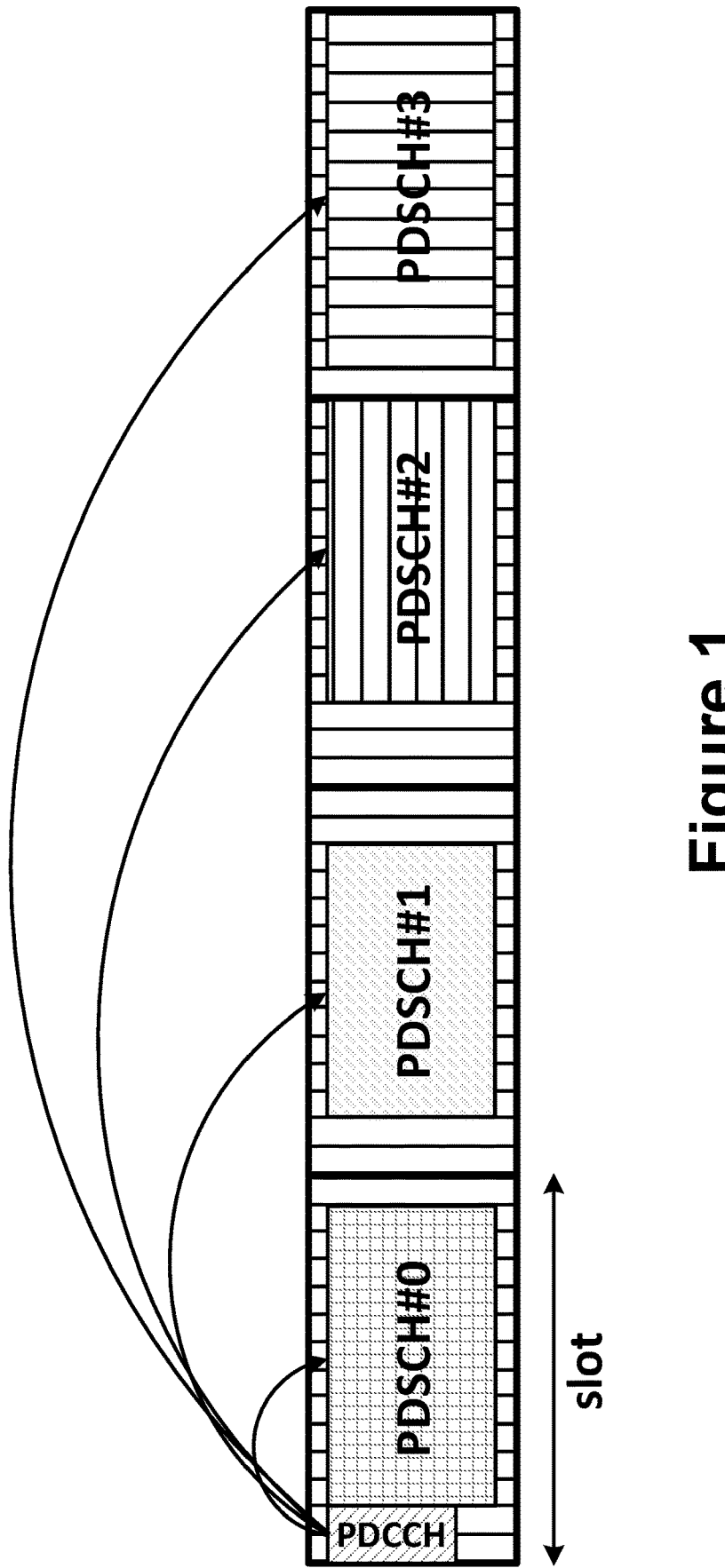
FIG. 1 illustrates an example of multi-PDSCH scheduling via a single PDCCH, in accordance with various embodiments.

As discussed above, a PDCCH (e.g., DCI) may schedule multiple PDSCHs or PUSCHs (e.g., that carry different transport blocks (TBs)). FIG. 1 illustrates one example of multi-PDSCH scheduling via a single PDCCH. In the example, one PDCCH is used to schedule 4 PDSCHs with different TBs. Further, different time domain resource allocation is applied for different PDSCHs.

Note that for multi-PDSCH and multi-PUSCH based scheduling, hybrid automatic repeat request (HARQ) process number indicated in the downlink control information (DCI) is applied for the first scheduled PDSCH or PUSCH. Further, it is incremented by 1 for subsequent PDSCHs or PUSCHs with modulo operation. In addition, if a scheduled PDSCH/PUSCH is dropped due to collision with UL/DL symbol(s) indicated by tdd-UL-DL-ConfigurationCommon or tdd-UL-DL-ConfigurationDedicated, HARQ process ID increment is skipped for the PDSCH/PUSCH and applied only for valid PDSCH(s)/PUSCH(s).

However, if a scheduled PDSCH/PUSCH is dropped due to collision with UL or DL direction which is indicated by dynamic slot format indicator (SFI) in the DCI format 2_0, certain mechanism may need to be defined on the determination of HARQ process ID in case of multi-PDSCH or multi-PUSCH scheduling.

Furthermore, if the resulting HARQ process ID for at least one PDSCH/PUSCH of multi-PDSCH/PUSCH scheduled by a single PDCCH collides with a HARQ process ID allocated for SPS PDSCH or CG PUSCH, certain mechanism may need to be defined on the determination of HARQ process ID in case of multi-PDSCH or multi-PUSCH scheduling.

Various embodiments herein provide mechanisms for the determination of HARQ process ID. In some embodiments, the mechanisms may be used for a system operating above 52.6 GHz carrier frequency. For example, embodiments provide techniques for:

HARQ process ID determination in case of multi-PDSCH/PUSCH scheduling

Handling conflict of HARQ process ID between dynamic grant (DG)-PDSCH/PUSCH and SPS PDSCH/CG-PUSCH.

Type3 HARQ-ACK codebook with time bundling

HARQ Process ID Determination in Case of Multi-PDSCH/PUSCH Scheduling

As mentioned above, for multi-PDSCH and multi-PUSCH based scheduling, hybrid automatic repeat request (HARQ) process number indicated in the downlink control information (DCI) is applied for the first scheduled PDSCH or PUSCH. Further, it is incremented by 1 for subsequent PDSCHs or PUSCHs with modulo operation. In addition, if a scheduled PDSCH/PUSCH is dropped due to collision with UL/DL symbol(s) indicated by tdd-UL-DL-ConfigurationCommon or tdd-UL-DL-ConfigurationDedicated, HARQ process ID increment is skipped for the PDSCH/PUSCH and applied only for valid PDSCH(s)/PUSCH(s).

However, if a scheduled PDSCH/PUSCH is dropped due to collision with UL or DL direction which is indicated by dynamic slot format indicator (SFI) in the DCI format 2_0, certain mechanism may need to be defined on the determination of HARQ process ID in case of multi-PDSCH or multi-PUSCH scheduling.

Embodiments on the HARQ process ID determination in case of multi-PDSCH/PUSCH are described further below.

Figure 2:
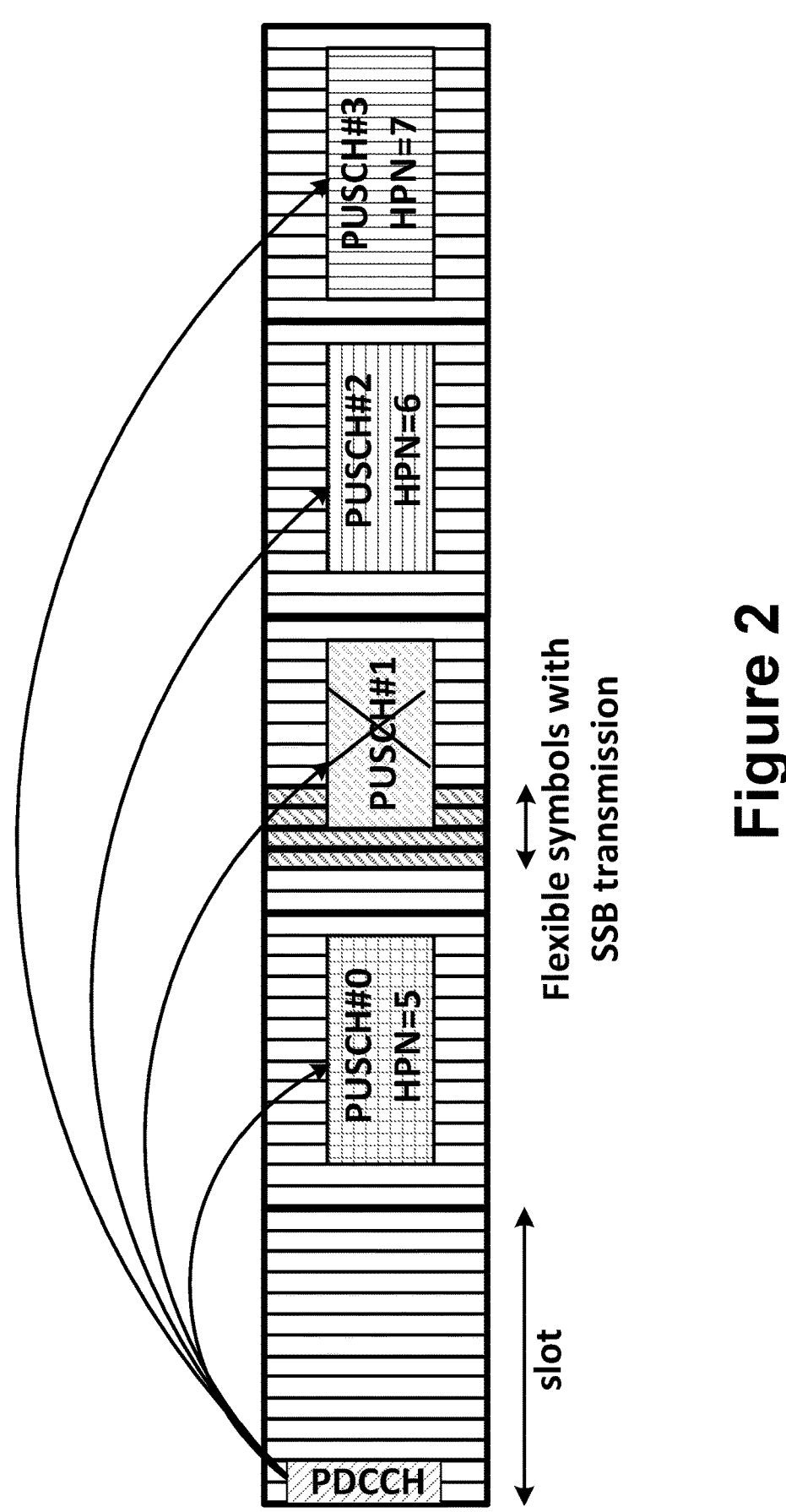
FIG. 2 illustrates an example of hybrid automatic repeat request (HARQ) process identifier (ID) determination in case of multi-PUSCH scheduling, in accordance with various embodiments.

In one embodiment, when a scheduled PUSCH transmission is dropped due to collision with flexible symbols which are configured by semi-static UL/DL configuration, e.g., tdd-UL-DL-ConfigurationCommon or tdd-UL-DL-ConfigurationDedicated, and used for SSB transmission, then HARQ process ID increment is skipped for the PUSCH and applied for valid PUSCHs. In this case, the cancelled PUSCH transmission is considered as invalid PUSCH in case of multi-PUSCH scheduling. Note that SSB transmission is indicated as a set of symbols of an SS/PBCH block with candidate SS/PBCH block index corresponding to the SS/PBCH block index indicated to a UE by ssb-PositionsInBurst in SIB1 or ssb-PositionsInBurst in ServingCellConfigCommon FIG. 2 illustrates one example of HARQ process ID determination in case of multi-PUSCH scheduling. In the example, a DCI is used to schedule 4 PUSCHs. Further, PUSCH #1 is dropped due to collision with flexible symbols with SSB transmission. In this case, this PUSCH is considered as invalid PUSCH and HARQ process ID for this cancelled PUSCH is skipped.

In another embodiment, when a scheduled PUSCH transmission is dropped due to collision with flexible symbols which are configured by semi-static UL/DL configuration, e.g., tdd-UL-DL-ConfigurationCommon or tdd-UL-DL-ConfigurationDedicated and with CORESET0 with Type0-PDCCH CSS set and/or invalid UL symbols for DL-to-UL switching, HARQ process ID increment is skipped for the PUSCH and applied for valid PUSCHs. In this case, the cancelled PUSCH transmission is considered as invalid PUSCH in case of multi-PUSCH scheduling.

In another embodiment, when a scheduled PUSCH transmission is dropped due to collision with flexible symbols which are configured by semi-static UL/DL configuration, e.g., tdd-UL-DL-ConfigurationCommon or tdd-UL-DL-ConfigurationDedicated and with SSB transmission, CORESET0 with Type0-PDCCH CSS set and invalid UL symbols for DL-to-UL switching, HARQ process ID increment is still continued and not skipped for the PUSCH and applied for valid PUSCHs. In this case, the cancelled PUSCH transmission is considered as valid PUSCH in case of multi-PUSCH scheduling.

In another embodiment, when a scheduled PUSCH transmission is dropped due to collision with invalid UL symbols for DL-to-UL switching after the last symbol that is indicated as downlink in each consecutive set of all symbols that are indicated as downlink by tdd-UL-DL-ConfigurationCommon or tdd-UL-DL-ConfigurationDedicated, HARQ process ID increment is skipped for the PUSCH and applied for valid PUSCHs. In this case, the cancelled PUSCH transmission is considered as invalid PUSCH in case of multi-PUSCH scheduling.

In another embodiment, if a scheduled PDSCH/PUSCH is dropped due to collision with UL/DL direction as indicated by dynamic SFI in the DCI format 2_0, UL cancellation indication, or higher priority transmission, etc., HARQ process ID increment is skipped. In this case, the cancelled PDSCH or PUSCH transmission is considered as invalid PDSCH or PUSCH in case of multi-PDSCH or multi-PUSCH scheduling, respectively.

In another embodiment, if a scheduled PDSCH/PUSCH is dropped due to collision with UL/DL direction as indicated by dynamic SFI in the DCI format 2_0, UL cancellation indication, or higher priority transmission, etc., HARQ process ID increment is still continued and not skipped. In this case, the cancelled PDSCH or PUSCH transmission is considered as valid PDSCH or PUSCH in case of multi-PDSCH or multi-PUSCH scheduling, respectively.

Figure 3:
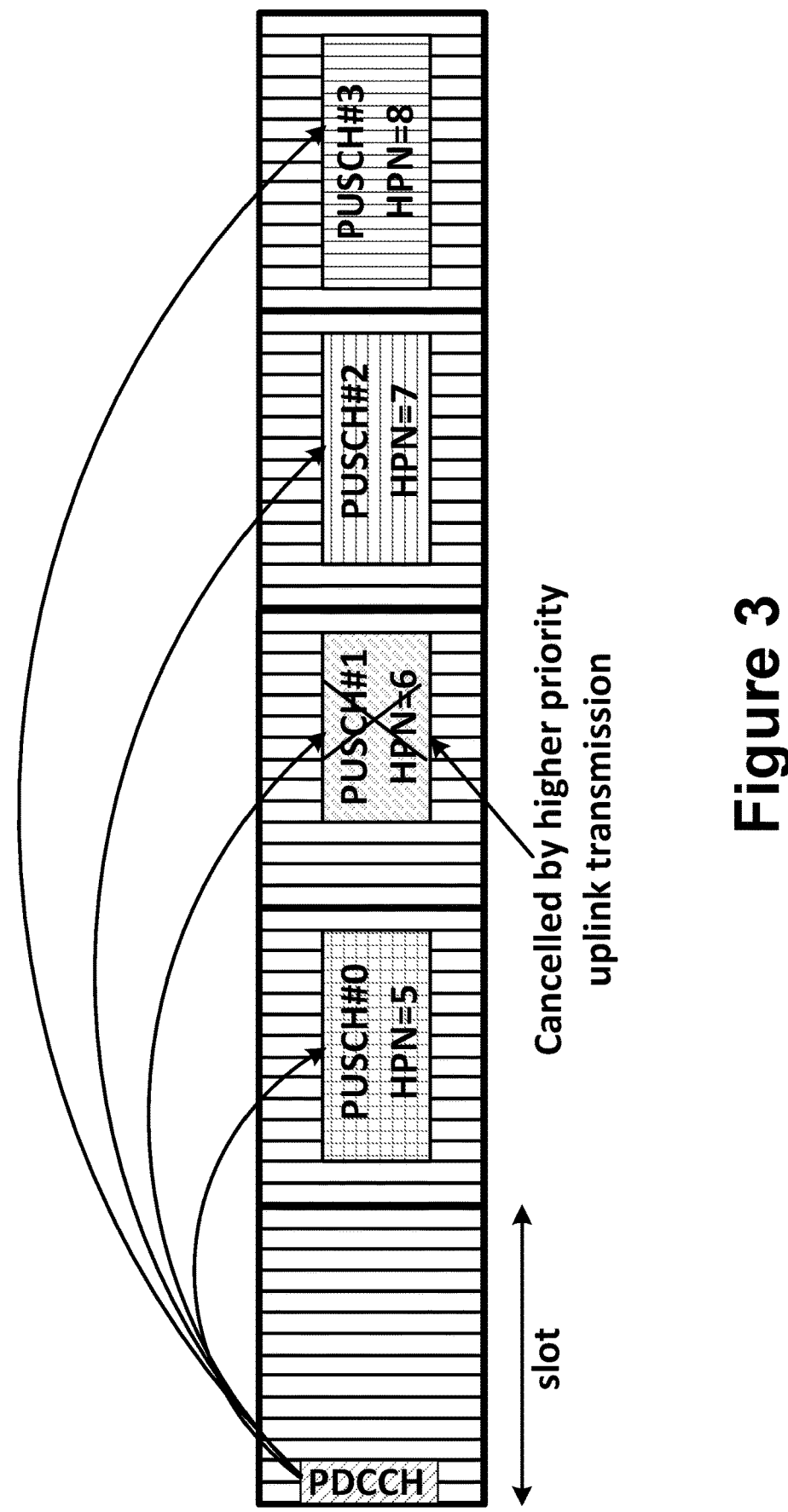
FIG. 3 illustrates another example of HARQ process ID determination in case of multi-PUSCH scheduling, in accordance with various embodiments.

FIG. 3 illustrates one example of HARQ process ID determination in case of multi-PUSCH scheduling. In the example, a DCI is used to schedule 4 PUSCHs. Further, PUSCH #1 is dropped due to collision with higher priority uplink transmission. In this case, this PUSCH is considered as valid PUSCH and HARQ process ID for this cancelled PUSCH is still incremented.

In another embodiment, if a scheduled PDSCH/PUSCH is dropped due to collision with the idle period of a Fixed Frame Period (FFP), HARQ process ID increment is skipped for the PUSCH and applied for valid PUSCHs. In this case, the cancelled PUSCH transmission is considered as invalid PUSCH in case of multi-PUSCH scheduling. For example, if a UE is configured with semi-static channel access, and the UE transmits as an initiating device, and if a scheduled PUSCH overlaps with idle period of the UE FFP, then, the PUSCH is dropped, and the HARQ process ID is skipped.

In another embodiment, if a scheduled PDSCH/PUSCH is dropped due to collision with the idle period of a Fixed Frame Period (FFP), HARQ process ID increment is still continued and not skipped. In this case, the cancelled PUSCH transmission is considered as valid PUSCH in case of multi-PUSCH scheduling.

Handling Conflict of HARQ Process ID Between DG-PDSCH/PUSCH and SPS PDSCH/CG-PUSCH As mentioned above, if the resulting HARQ process ID for at least one PDSCH/PUSCH of multi-PDSCH/PUSCH scheduled by a single PDCCH collides with a HARQ process ID allocated for SPS PDSCH or CG PUSCH, certain mechanism may need to be defined on the determination of HARQ process ID in case of multi-PDSCH or multi-PUSCH scheduling.

In the following embodiments, a valid SPS PDSCH is an activated SPS PDSCH. Alternatively, a valid SPS PDSCH is an activated SPS PDSCH not semi-statically cancelled. For example, a valid SPS PDSCH does not collide with UL symbols configured by semi-static UL/DL configuration. For another example, a valid SPS PDSCH does not overlap with another valid SPS PDSCH with lower SPS configuration index, at least for the same priority. For another example, a valid SPS PDSCH does not with another valid SPS PDSCH with higher priority. For another example, a valid SPS PDSCH does not expect to be cancelled due to UE capability for the number of unicast PDSCHs in a slot supported by the UE. Alternatively, a valid SPS PDSCH does not collide with flexible symbols indicated by SFI or UL symbols indicated by SFI or dynamic UL grant. For another example, a valid SPS PDSCH does not expect to be overridden by another PDSCH scheduled by DCI.

In the following embodiments, a valid CG PUSCH is an activated CG PUSCH. A valid CG PUSCH is an active CG PUSCH not semi-statically cancelled. For example, a valid CG PUSCH does not collide with DL symbols configured by semi-static UL/DL configuration. For another example, a valid CG PUSCH does not collide with SS/PBCH symbols indicated by ssb-PositionsInBurst in SIB1 or ssb-PositionsInBurst in ServingCellConfigCommon. For another example, a valid CG PUSCH does not overlap with another valid CG PUSCH with higher priority. Alternatively, a valid CG PUSCH does not collide with flexible symbols indicated by SFI or DL symbols indicated by SFI or DL assignment. For another example, a valid CG PUSCH does not expect to be overridden by another PUSCH scheduled by DCI. The definition of valid SPS PDSCH and CG PUSCH is also applicable to other embodiment.

Embodiments of handling conflict of HARQ process ID between DG-PDSCH/PUSCH and SPS PDSCH/CG-PUSCH are described further below In one embodiment, if a HARQ process ID for a PDSCH/PUSCH in case of multi-PDSCH/PUSCH scheduling would collide with a HARQ process ID occupied by SPS PDSCH or CG PUSCH, the HARQ process ID for the PDSCH/PUSCH in case of multi-PDSCH/PUSCH scheduling should be incremented to the next HARQ process ID which does not collide with the HARQ process ID occupied by SPS PDSCH or CG PUSCH. In this case, the HARQ process ID occupied by SPS PDSCH or CG PUSCH is the HARQ process ID(s) configured by gNB for all SPS PDSCHs or CG PUSCHs, for example, by RRC signaling, or the HARQ process ID(s) for all SPS PDSCHs or CG PUSCHs derived by the function of the number of HARQ processes configured for SPS PDSCH or CG PUSCH, HARQ process ID offset, and time domain location for SPS PDSCH or CG PUSCH transmission. In one example, the SPS PDSCH or CG PUSCH is determined according to SPS PDSCH or CG PUSCH configuration by higher-layer signaling. In another example, the SPS PDSCH or CG PUSCH is determined according to the activated SPS PDSCH or CG PUSCH.

In another embodiment, if a HARQ process ID for a PDSCH/PUSCH in case of multi-PDSCH/PUSCH scheduling would collide with a HARQ process ID occupied by SPS PDSCH or CG PUSCH, the HARQ process ID for the PDSCH/PUSCH in case of multi-PDSCH/PUSCH scheduling should be incremented to the next HARQ process ID which does not collide with the HARQ process ID occupied by SPS PDSCH or CG PUSCH. In this case, the HARQ process ID occupied by SPS PDSCH or CG PUSCH is the HARQ process ID that is currently occupied by valid SPS PDSCH or CG PUSCH. The HARQ process ID that is currently occupied by valid SPS PDSCH or CG PUSCH is the subset of HARQ process IDs configured for SPS PDSCH or CG PUSCH by gNB.

In this case, if the PUSCH of multi-PUSCH is scheduled by a PDCCH with PDCCH ending in symbol i, and the CG PUSCH starts in symbol j, and the gap between the end of PDCCH and the beginning of symbol j is less than N symbols if symbol j is after symbol i, the HARQ process ID for the CG PUSCH is considered as currently occupied by valid CG PUSCH, and it cannot be used by the PUSCH scheduled by the PDCCH. The value N in symbols is determined according to the UE processing capability or configured by gNB. Then, the HARQ process ID for the PUSCH scheduled by the PDCCH should be incremented to the next HARQ process ID which is not currently occupied by valid CG PUSCH.

Figure 4:
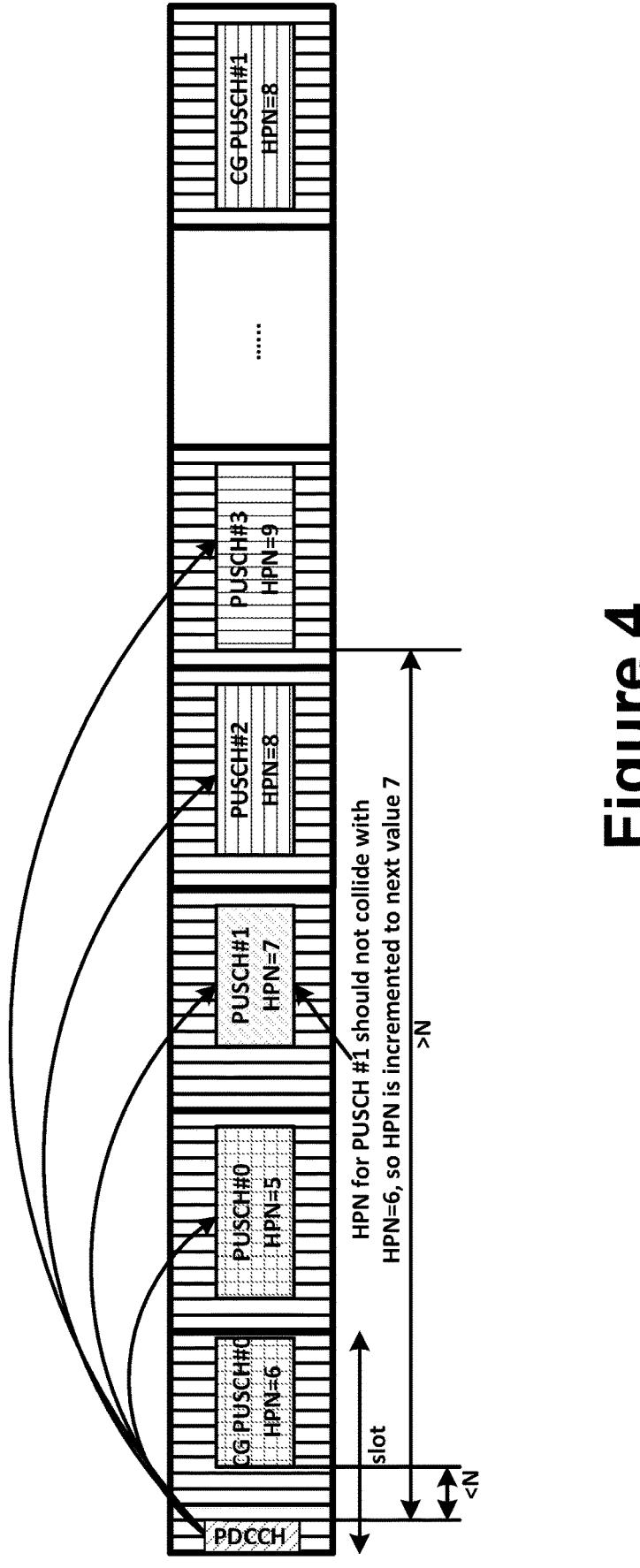
FIG. 4 illustrates another example of HARQ process ID determination in case of multi-PUSCH scheduling, in accordance with various embodiments.

FIG. 4 illustrates one example of HARQ process ID determination in case of multi-PUSCH scheduling. In the example, a DCI is used to schedule 4 PUSCHs. Further, CG PUSCH is using HARQ process ID 6. Assuming N=144, the gap between ending symbol of PDCCH and the starting symbol of CG PUSCH #0 is less than 144 symbols, the gap between ending symbol of PDCCH and the starting symbol of CG PUSCH #1 is larger than 144 symbols, therefore HARQ process ID 6 is considered as currently occupied by valid CG PUSCH #0, but HARQ process ID #8 is not considered as currently occupied by valid CG PUSCH #1. If the HARQ process ID for PUSCH #0~3 does not take CG PUSCH into account, the HARQ process ID should be 5,6,7,8 respectively. If the HARQ process ID for PUSCH #0~3 takes the HARQ process ID currently occupied by valid CG PUSCH into account, then, HARQ process ID of PUSCH #0~#3 is 5,7,8 and 9 respectively.

In another case, if the PDSCH of multi-PDSCH is scheduled by a PDCCH with PDSCH starting in symbol i, and the expected PUCCH for SPS PDSCH HARQ-ACK ends in symbol j, and the beginning of symbol i is not after the end of symbol j, the HARQ process ID for the SPS PDSCH is considered as currently occupied by valid SPS PDSCH, and it cannot be used by the PDSCH scheduled by the PDCCH. Then, the HARQ process ID for the PDSCH scheduled by the PDCCH should be incremented to the next HARQ process ID which is not currently occupied by valid SPS PDSCH.

Figure 5:
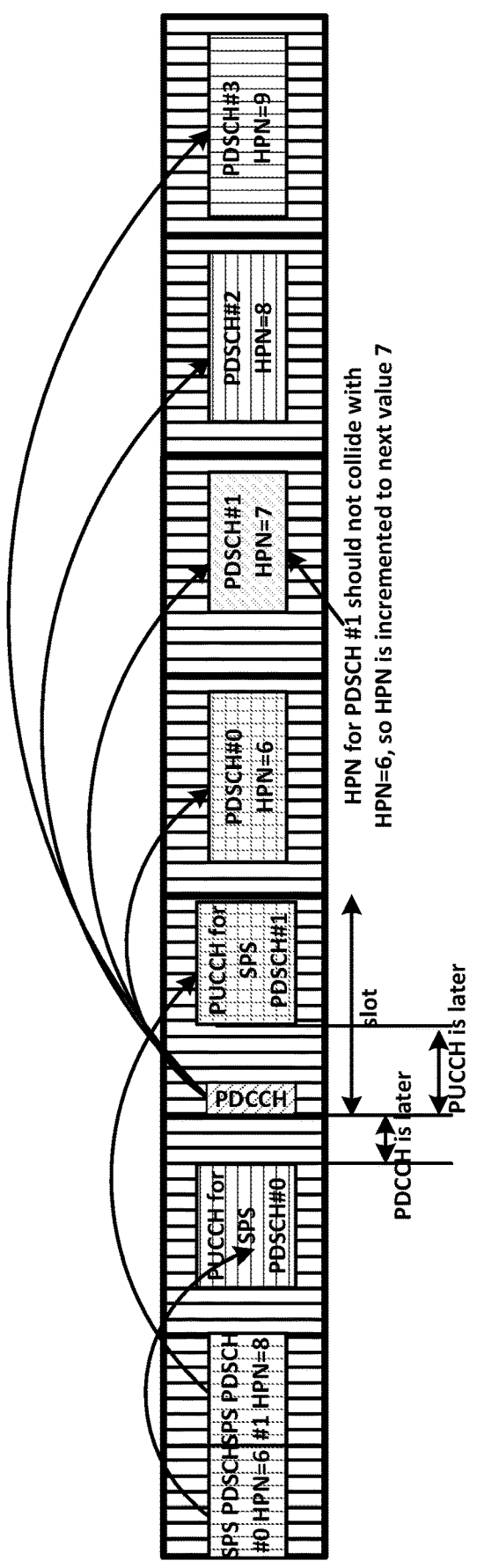
FIG. 5 illustrates an example of HARQ process ID determination in case of multi-PDSCH scheduling, in accordance with various embodiments.

FIG. 5 illustrates one example of HARQ process ID determination in case of multi-PDSCH scheduling. In the example, a DCI is used to schedule 4 PDSCHs. Further, SPS PDSCH #0 is using HARQ process ID 5. PUCCH for SPS PDSCH #0 HARQ-ACK ends before the starting symbol of PDCCH. SPS PDSCH #1 is using HARQ process ID 6. PUCCH for SPS PDSCH #1 HARQ-ACK ends after the starting symbol of PDCCH. If the HARQ process ID for PDSCH #0~3 does not take SPS PDSCH into account, the HARQ process ID should be 5,6,7,8 respectively. If the HARQ process ID for PDSCH #0~3 takes the HARQ process ID currently occupied by valid SPS PDSCH into account, then, HARQ process ID of PDSCH #0~#3 is 5,7,8 and 9 respectively, because HARQ process ID 6 is currently used by SPS PDSCH #1.

In one embodiment, if a HARQ process ID for a PDSCH/PUSCH in case of multi-PDSCH/PUSCH scheduling would collide with a HARQ process ID occupied by SPS PDSCH or CG PUSCH, the PDSCH/PUSCH in case of multi-PDSCH/PUSCH scheduling should be dropped. In this case, the HARQ process ID occupied by SPS PDSCH or CG PUSCH is the HARQ process ID(s) configured by gNB for all SPS PDSCHs or CG PUSCHs, for example, by RRC signaling, or the HARQ process ID(s) for all SPS PDSCHs or CG PUSCHs derived by the function of the number of HARQ processes configured for SPS PDSCH or CG PUSCH, HARQ process ID offset, and time domain location for SPS PDSCH or CG PUSCH transmission. In one example, the SPS PDSCH or CG PUSCH is determined according to SPS PDSCH or CG PUSCH configuration by higher-layer signaling. In another example, the SPS PDSCH or CG PUSCH is determined according to the activated SPS PDSCH or CG PUSCH.

In another embodiment, if a HARQ process ID for a PDSCH/PUSCH in case of multi-PDSCH/PUSCH scheduling would collide with a HARQ process ID occupied by SPS PDSCH or CG PUSCH, the PDSCH/PUSCH in case of multi-PDSCH/PUSCH scheduling should be dropped. In this case, the HARQ process ID occupied by SPS PDSCH or CG PUSCH is the HARQ process ID that is currently occupied by valid SPS PDSCH or CG PUSCH. The HARQ process ID that is currently occupied by valid SPS PDSCH or CG PUSCH is the subset of HARQ process IDs configured for SPS PDSCH or CG PUSCH by gNB.

In this case, if the PUSCH of multi-PUSCH is scheduled by a PDCCH with PDCCH ending in symbol i, and the CG PUSCH starts in symbol j, and the gap between the end of PDCCH and the beginning of symbol j is less than N symbols if symbol j is after symbol i, the HARQ process ID for the CG PUSCH is considered as currently occupied by valid CG PUSCH. The value N in symbols is determined according to the UE processing capability or configured by gNB. Then, if the HARQ process ID for the PUSCH scheduled by the PDCCH collides with the HARQ process ID currently occupied by valid CG PUSCH, the PUSCH scheduled by PDCCH is dropped. Otherwise, the PUSCH scheduled by PDCCH can be transmitted. Alternatively, if the HARQ process ID for the PUSCH scheduled by the PDCCH collides with the HARQ process ID currently occupied by valid CG PUSCH, the CG PUSCH is dropped.

Figure 6:
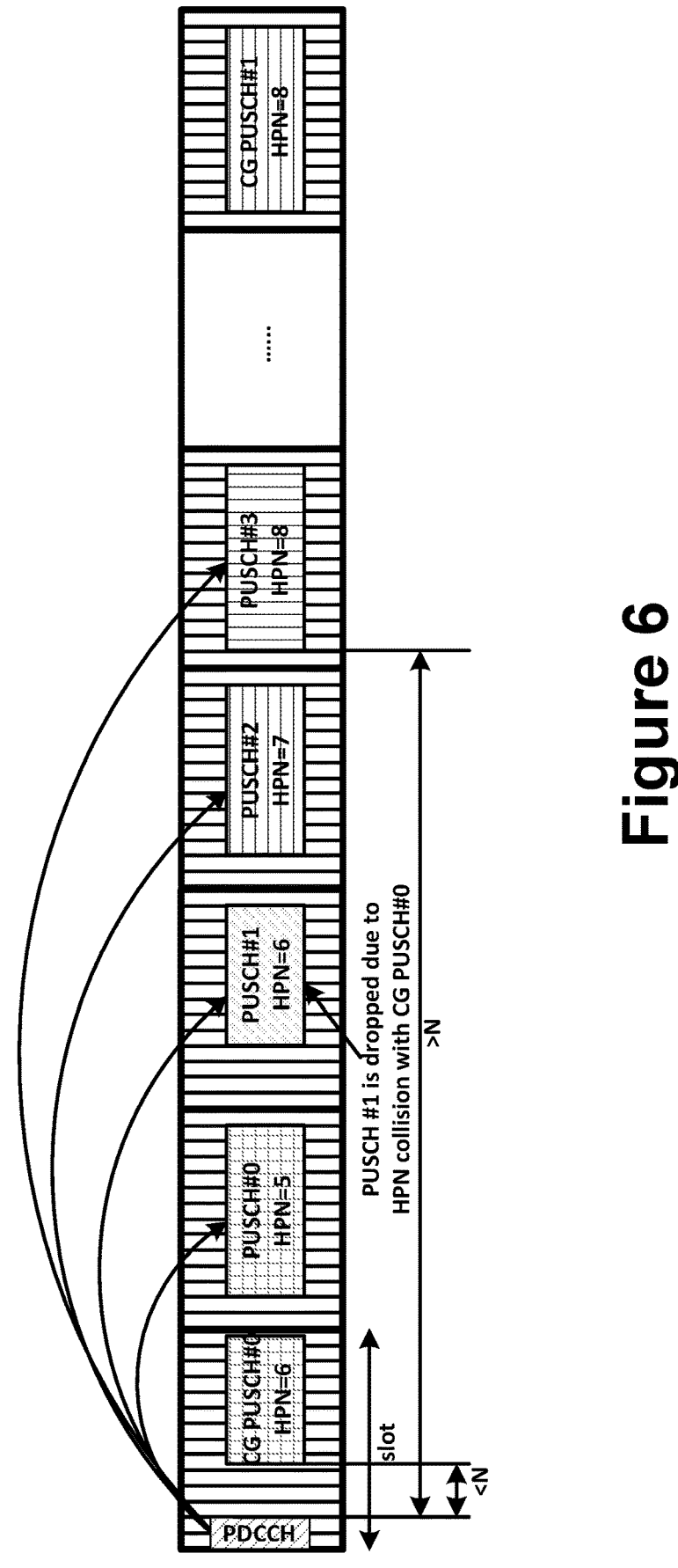
FIG. 6 illustrates an example of HARQ process ID determination and PUSCH transmission in case of multi-PUSCH scheduling, in accordance with various embodiments.

FIG. 6 illustrates one example of HARQ process ID determination and PUSCH transmission in case of multi-PUSCH scheduling. In the example, a DCI is used to schedule 4 PUSCHs. Further, CG PUSCH is using HARQ process ID 6. Assuming N=144, the gap between ending symbol of PDCCH and the starting symbol of CG PUSCH #0 is less than 144 symbols, the gap between ending symbol of PDCCH and the starting symbol of CG PUSCH #1 is larger than 144 symbols, therefore HARQ process ID 6 is considered as currently occupied by valid CG PUSCH #0, but HARQ process ID #8 is not considered as currently occupied by valid CG PUSCH #1. The HARQ process ID for PUSCH #0 is 5 as indicated by gNB, and HARQ process ID is incremented by 1 for the remaining PUSCHs, then, the HARQ process ID for PUSCH #0~#3 is 5,6,7 and 8 respectively. Since the HARQ process ID of PUSCH #1 collides with CG PUSCH #0, PUSCH #1 should be dropped.

In another case, if the PDSCH of multi-PDSCH is scheduled by a PDCCH with PDSCH starting in symbol i, and the expected PUCCH for SPS PDSCH HARQ-ACK ends in symbol j, and the beginning of symbol i is not after the end of symbol j, the HARQ process ID for the SPS PDSCH is considered as currently occupied by valid SPS PDSCH. Then, if the HARQ process ID for the PDSCH scheduled by the PDCCH collides with the HARQ process ID currently occupied by valid SPS PDSCH, the PDSCH scheduled by the PDCCH is dropped. Otherwise, the PDSCH scheduled by the PDCCH can be transmitted. Alternatively, if the HARQ process ID for the PDSCH scheduled by the PDCCH collides with the HARQ process ID currently occupied by valid SPS PDSCH, the SPS PDSCH is dropped.

Figure 7:
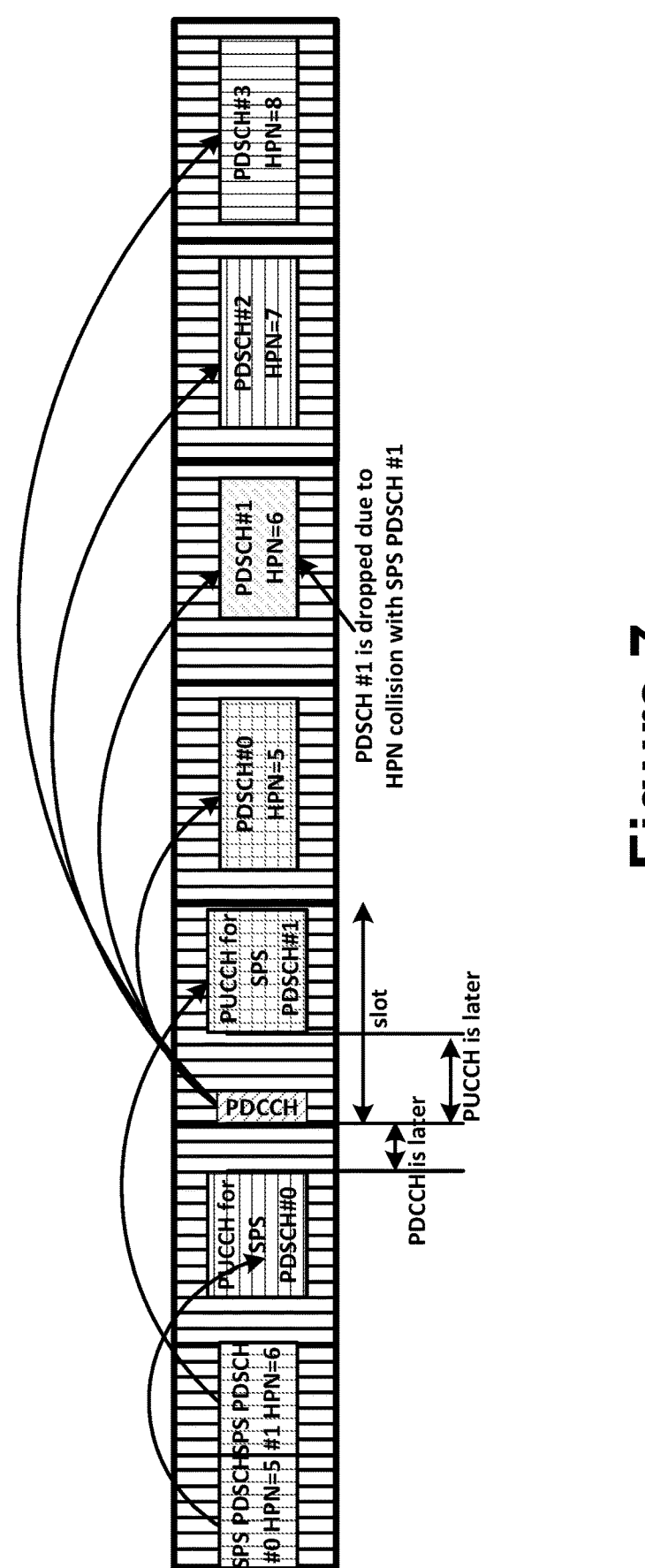
FIG. 7 illustrates an example of HARQ process ID determination and PDSCH transmission in case of multi-PDSCH scheduling, in accordance with various embodiments.

FIG. 7 illustrates one example of HARQ process ID determination and PDSCH transmission in case of multi-PUSCH scheduling. In the example, a DCI is used to schedule 4 PDSCHs. Further, SPS PDSCH #0 is using HARQ process ID 5. PUCCH for SPS PDSCH #0 HARQ-ACK ends before the starting symbol of PDCCH. SPS PDSCH #1 is using HARQ process ID 6. PUCCH for SPS PDSCH #1 HARQ-ACK ends after the starting symbol of PDCCH. The HARQ process ID for PDSCH #0 is 5 as indicated by gNB, and HARQ process ID is incremented by 1 for the remaining PDSCHs, then, the HARQ process ID for PDSCH #0~#3 is 5,6,7 and 8 respectively. Since the HARQ process ID of PDSCH #1 collides with SPS PDSCH #1, then, PDSCH #1 should be dropped.

In one embodiment, if the PUSCH of multi-PUSCH is scheduled by a PDCCH with PDCCH ending in symbol i, and the CG PUSCH starts in symbol j, and if the end of symbol i is not at least N symbols before the beginning of symbol j, and the PUSCH scheduled by the PDCCH overlaps in time with the CG PUSCH on the same serving cell, the PUSCH scheduled by the PDCCH is dropped. The HARQ process ID increment is skipped. In this case, the dropped PUSCH transmission is considered as invalid PUSCH in case of multi-PUSCH scheduling. The value N in symbols is determined according to the UE processing capability or configured by gNB.

Figure 8:
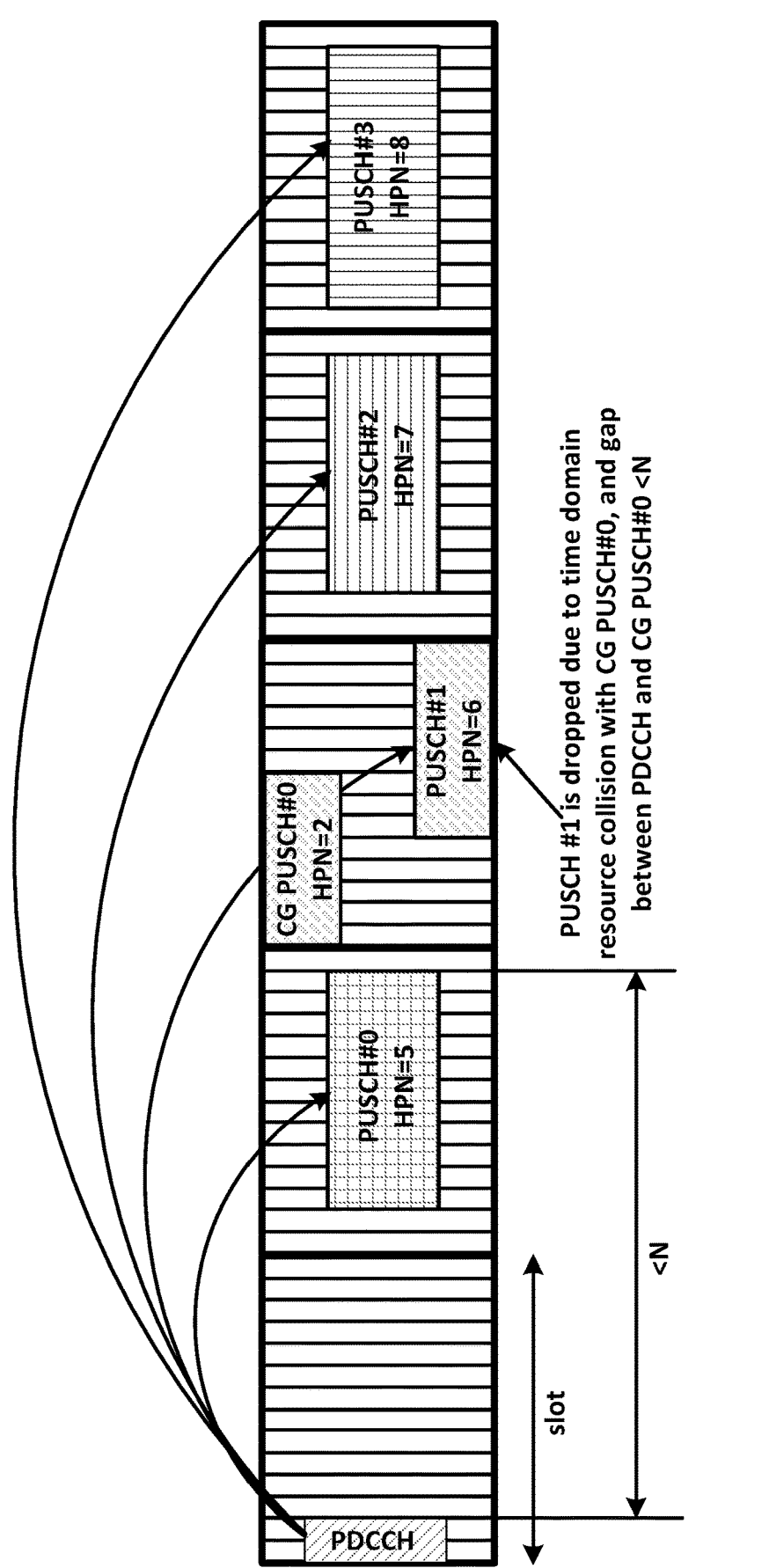
FIG. 8 illustrates another example of HARQ process ID determination and PUSCH transmission in case of multi-PUSCH scheduling, in accordance with various embodiments.

FIG. 8 illustrates one example of HARQ process ID determination and PUSCH transmission in case of multi-PUSCH scheduling. In the example, a DCI is used to schedule 4 PUSCHs. Further, CG PUSCH is using HARQ process ID 6. Assuming N=144, the gap between ending symbol of PDCCH and the starting symbol of CG PUSCH #0 is less than 144 symbols. PUSCH #1 overlaps with CG PUSCH #0 in time domain, and the gap between PDCCH ending symbol and CG PUSCH #0 starting symbol is less than N. Therefore, PUSCH #1 is dropped. HARQ process ID for PUSCH #0, #2 and #3 is 5, 6 and 7 respectively.

In another embodiment, if the PUSCH of multi-PUSCH is scheduled by a PDCCH with PDCCH ending in symbol i, and the CG PUSCH starts in symbol j, and if the end of symbol i is not at least $N_2$ symbols before the beginning of symbol j, and the PUSCH scheduled by the PDCCH overlaps in time with the CG PUSCH on the same serving cell, the CG PUSCH is dropped. The value N in symbols is determined according to the UE processing capability or configured by gNB.

In one embodiment, if the PDSCH of multi-PDSCH is scheduled by a PDCCH with PDCCH ending in symbol i, and the SPS PDSCH starts in symbol j, and if the end of symbol i is not at least M symbols before the beginning of symbol j, and the PDSCH scheduled by the PDCCH overlaps in time with the SPS PDSCH on the same serving cell, the PDSCH scheduled by the PDCCH is dropped. The HARQ process ID increment is skipped. In this case, the dropped PDSCH transmission is considered as invalid PDSCH in case of multi-PDSCH scheduling. The value N in symbols is determined according to the UE processing capability or configured by gNB.

In another embodiment, if the PDSCH of multi-PDSCH is scheduled by a PDCCH with PDCCH ending in symbol i, and the SPS PDSCH starts in symbol j, and if the end of symbol i is not at least M symbols before the beginning of symbol j, and the PDSCH scheduled by the PDCCH overlaps in time with the SPS PDSCH on the same serving cell, the SPS PDSCH is dropped. The value N in symbols is determined according to the UE processing capability or configured by gNB.

Type3 HARQ-ACK Codebook with Time Bundling

The application of multi-PDSCH scheduling for PDSCH transmission for a UE does not necessarily mean that the uplink channel condition is good for the UE. Therefore, it is beneficial to consider certain bundling scheme to reduce HARQ-ACK payload on PUCCH or PUSCH. In NR, spatial bundling for Type3 HARQ-ACK codebook is already supported if new data indicator (NDI) is not reported in the codebook. On the other hand, if NDI is reported in the Type3 HARQ-ACK codebook, spatial bundling is not supported. Time bundling can be further considered to reduce the size of Type3 HARQ-ACK codebook. Specifically, time bundling of the HARQ-ACK bits for the PDSCHs that are scheduled by a same DCI for multi-PDSCH scheduling can be used. Since the multiple PDSCHs are scheduled by the same DCI, they are either received or not received as a whole. Consequently, there will be no error case for the generation of bundled HARQ-ACK bits.

Denote the maximum number of HARQ processes (HP) as $M_{max}$, denote the number of HPs as X for which the corresponding HARQ-ACK bits are bundled, the total number of bundled HARQ-ACK bits for a serving cell is $\lceil M_{max}/X \rceil$ if single transport block (TB) per PDSCH transmission is configured or two TBs per PDSCH transmission with spatial bundling is configured by high layer signaling, or $2 \cdot \lceil M_{max}/X \rceil$ if two TBs per PDSCH transmission without spatial bundling is configured by high layer signaling.

In one embodiment, a fixed pattern for the correspondence between each bundled bit and the associated HPs are defined. For example, the $k^{th}$ bundled bit is generated by bundling the HARQ-ACK bits of HPs kX, kX+1, . . . , (k+1)X−1. gNB may always schedule the PDSCH transmissions with HPs kX, kX+1, . . . , (k+1)X−1 by a same DCI for multi-PDSCH scheduling, so that there is no confusion on the bundling operation. Alternatively, if the latest PDSCHs with the set of HPs associated with a bundled bit are scheduled by multiple DCIs, and if the HARQ-ACK information for a subset of the set of HPs are not reported yet, UE may expect that the latest PDSCH transmissions of the subset of HPs are scheduled by the same DCI. The bundled bit is generated by bundling the HARQ-ACK information of the subset of HPs. Alternatively, if the HARQ-ACK information of the latest PDSCH transmission of a HP is already reported, ACK is assumed for the HP in the bundling operation.

Figure 9:
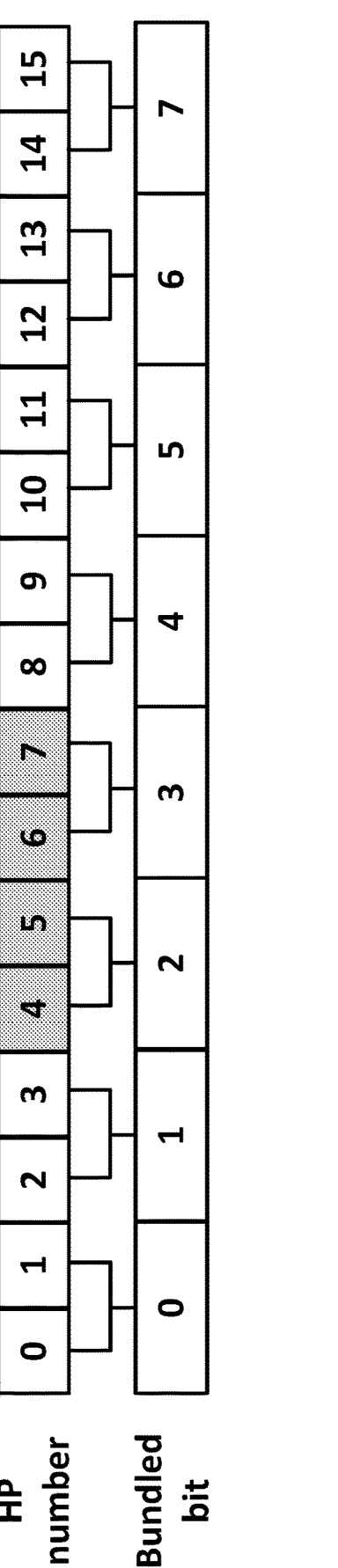
FIG. 9 illustrates an example of fixed correspondence for each bundled bit of HARQ-acknowledgement (ACK) feedback and associated HARQ processes (HPs), in accordance with various embodiments.

FIG. 9 illustrates an example of the fixed correspondence for each bundled bit and the associated HPs. In the example, it is assumed that total number of HPs is 16 and HARQ-ACK for 2 HPs are bundled. Finally, 8 bundled bits are generated for HARQ-ACK transmission. Assuming 4 PDSCH transmissions with HP 4-7 are scheduled by a DCI, the 4 HARQ-ACK bits are bundled into 2 bundled bits with index 2 and 3.

In another embodiment, the bundled HPs associated with a bundled bit is determined by the HPs that are scheduled by a DCI for multi-PDSCH scheduling. Assuming M PDSCH transmissions are scheduled by a DCI with M HPs from n to mod(n+M−1, $M_{max}$) respectively, n=0, 1, . . . $M_{max}$−1, $\lceil M/X \rceil$ bundled bits are generated for the DCI and mapped starting from bit $b_{k0}$. The bit index k0 could be determined by the starting HP number n and the number of HPs per bundled bit X, e.g., k0=$\lfloor n/X \rfloor$. Alternatively, the bundled bit can be different for starting HP kX+[0, 1, . . . , X−1], e.g., k0=mod($\lfloor n/X \rfloor$+mod(n,X), $\lceil M_{max}/X \rceil$). Alternatively, the bit index k0 could be determined by the starting HP number n, the number of HPs per bundled bit X and a dynamically indicated offset s by the DCI, e.g., k0=mod($\lfloor n/X \rfloor$+s, $\lceil M_{max}/X \rceil$). For example, s=0 or 1, which is indicated by one explicit bit in the DCI or reinterpreted by certain existing field(s) in the DCI. Each bundled bit for the DCI corresponds to X PDSCH transmissions, except the last bundled bit for the DCI is only associated with mod(M,X) PDSCHs if M is not integer times of X. For example, the $k^{th}$ bundled bit is generated by bundling the HARQ-ACK bits of HPs n+kX+[0, 1, . . . , X−1], k=0, 1, . . . $\lceil M/X \rceil$−1. Alternatively, a bundled bit corresponds to X−1 PDSCH transmissions for $\lceil M/X \rceil \cdot X$−M bundled bits for the DCI, while a bundled bit corresponds to X−1 PDSCH transmissions for the other bundled bits for the DCI. In this scheme, UE may only determine the bundled bits of the HARQ-ACK information of a DCI if the HARQ-ACK information for the DCI is not reported yet before the transmission of the Type3 HARQ-ACK codebook. The remaining bundled bits can be set to NACK in the Type3 HARQ-ACK codebook. If HARQ-ACK information for the PDSCH transmissions scheduled by two DCIs are not reported yet, UE may expect that the associated bundled bits of the two DCIs are not conflicted in the Type3 HARQ-ACK codebook.

Figure 10:
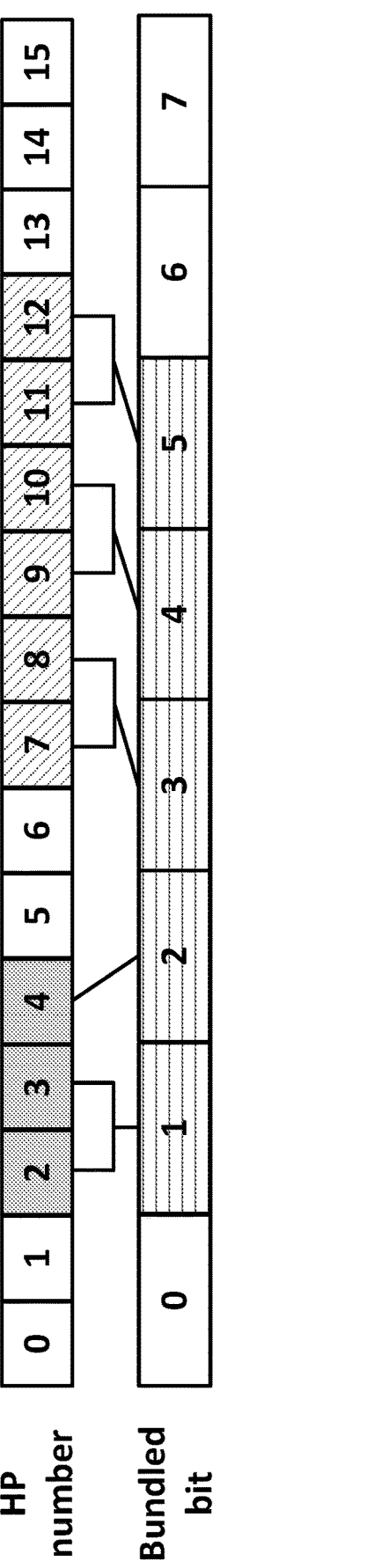
FIG. 10 illustrates another example of fixed correspondence for each bundled bit of HARQ-ACK feedback and associated HPs, in accordance with various embodiments.

FIG. 10 illustrates an example of the determination of HPs associated with each bundled bit based on a DCI for multi-PDSCH scheduling. In this example, it is assumed that the HARQ-ACK information for a first DCI scheduling PDSCH transmission with HP 2-4 and a second DCI scheduling PDSCH transmissions with HP 7-12 are not reported yet. On the other hand, the HARQ-ACK information for the latest PDSCH transmissions corresponding to other HPs are already reported. For the first DCI, HARQ-ACK bits for HP 2&3 are bundled to bundled bit b1. HARQ-ACK bit for HP 4 is the bundled bit b2. For the second DCI, 3 bundled bits b3-b5 are generated by bundling HP 7&8, HP 9&10 and HP 11&12 respectively. The remaining bundled bits b0, b6&b7 are padded with NACK.

Multi-PDSCH/PUSCH Scheduling with Two Transport Blocks (TBs)

gNB may semi-statically configure single TB or two TBs for a UE. For example, gNB configures maxNrofCode-WordsScheduledByDCI with value=1 or 2 for each BWP to support up to single or two TB transmission, respectively. If maxNrofCodeWordsScheduledByDCI=2, separate bit field for TB1 and TB2 are presented in a DCI. For each TB, the bit field includes MCS (modulation and coding scheme) indication, NDI (new data indicator) and RV (redundancy version). gNB can dynamically schedule single or two TBs per PDSCH transmission by DCI. For example, gNB can dynamically indicate single or two TBs transmission by antenna port(s)/rank/layer indication in DCI. Single TB is scheduled, if the indicated rank ≤4, otherwise, two TBs are scheduled.

In case of multi-PDSCH/PUSCH scheduling, gNB can configure the maximum number of PDSCH/PUSCHs $N_{1\_2TB}$ scheduled by a single DCI when two TBs are scheduled. UE does not expect gNB to schedule more than $N_{1\_2TB}$ PDSCH/PUSCHs for two TB transmission. The DCI size is determined by the maximum bit length for the case of multi-PDSCH/PUSCH scheduling with two TB and the case of multi-PDSCH/PUSCH scheduling with single TB. Alternatively, the DCI size is determined by the maximum bit length for the case of multi-PDSCH/PUSCH scheduling with two TB, the case of multi-PDSCH/PUSCH scheduling with single TB and the case of single PDSCH/PUSCH scheduling with single DCI.

In one embodiment, UE is configured with at least one TDRA row with more than one SLIVs, and UE is configured with maxNrofCodeWordsScheduledByDCI=2. UE determines Ns the number of PDSCHs scheduled by a DCI according to the number of SLIVs or number of valid SLIVs in the indicated row of TDRA table. UE determines the number of TBs scheduled by a DCI according to at least one of the indicated antenna ports, rank, layer, MSC, RV and number of PDSCHs. For example, if Ns the number of PDSCHs is larger than $N_{1\_2TB}$, UE assumes single TB is scheduled, and the single TB is transport block 1. If Ns the number of PDSCHs is no larger than $N_{1\_2TB}$, UE determines the number of TBs according to MCS and RV of the bit field for each TB.

In one example, if UE determines the number of scheduled TB is 1, and if UE determines Ns the number of PDSCHs is larger than $N_{1\_2TB}$, UE interprets the sequence of fields for transport block X of MCS, NDI, and RV as providing the indication of NDI and RV for a sub-set of scheduled PDSCHs. The transport block X is pre-defined, e.g., it is transport block 2. The sub-set of scheduled PDSCHs is $N_{1\_2TB}+1$ th~Nth PDSCH. UE identifies NDI and RV of $1^{st}$~$N_{1\_2TB}$ th PDSCH in another bit field, e.g., NDI and RV bit fields in for transport block 1.

For example, assuming $N_{1\_2TB}=2$, gNB schedules 6 valid PDSCHs by a single DCI, and indicates single TB transmission. In DCI, there is a bit field for $1^{st}$ TB, with 5 bits MCS, 2 bits NDI for 2 PDSCHs, and 2 bits RV for 2 PDSCHs, another bit field for $2^{nd}$ TB, with 5 bits MCS, 2 bits NDI for 2 PDSCHs, and 2 bits RV for 2 PDSCHs. UE identifies single TB scheduling according to antenna ports/ rank/layer indication in DCI. UE identifies 6 PDSCH scheduling by single DCI according to TDRA row. Then, UE determines MCS for all 6 PDSCHs according to MCS in $1^{st}$ TB bit field, and determines NDI and RV for $1^{st}$ and $2^{nd}$ PDSCH according to NDI and RV in $1^{st}$ TB bit field. UE determines NDI and RV for $3^{rd}$~$6^{th}$ PDSCHs using MCS, NDI and RV bit in $2^{nd}$ TB bit field.

In one example, if UE determines the number of scheduled TB is 2, UE does not expect Ns the number of PDSCHs is larger than $N_{1\_2TB}$. UE determines MCS, NDI and RV for each TB according to the bit field for transport block 1 and 2 respectively.

In another example, if UE determines the number of scheduled TB is 2, and if UE determines Ns the number of PDSCHs is larger than $N_{1\_2TB}$, UE assumes only $1^{st}$~$N_{1\_2TB}$ th SLIV or valid SLIV is applicable. UE determines MCS, NDI and RV for each TB according to the bit field for transport block 1 and 2 respectively.

In another example, if UE determines the number of scheduled TB is 2, UE assumes the $1^{st}$~Xth SLIV or valid SLIV is applicable, X=min($N_s$, $N_{1\_2TB}$). UE determines MCS, NDI and RV for each TB according to the bit field for transport block 1 and 2 respectively.

In another example, UE assumes the $1^{st}$~Xth SLIV or valid SLIV is applicable, X=min($N_s$, $N_{max}$). $N_{max}$ is the maximum number of PDSCHs that can be scheduled by a single DCI. For example, the maximum number of PDSCH is 8 if single TB per PDSCH is configured.

In another embodiment, UE is configured with at least one TDRA row with more than one SLIVs, and UE is configured with maxNrofCodeWordsScheduledByDCI=2. UE determines the number of PDSCHs scheduled by a DCI according to the number of SLIVs or number of valid SLIVs in the indicated row of TDRA table. UE determines the number of TBs scheduled by a DCI according to at least one of the indicated antenna ports, rank, layer, MSC, RV and number of PDSCHs.

In one example, if UE determines the number of scheduled TB is 1, UE assumes the bit length for NDI and RV for $1^{st}$ TB is determined based on the maximum number of schedulable PDSCHs among all rows in TDRA. Each bit corresponds to one scheduled PDSCH. UE assumes the bit length of the bit field for $2^{nd}$ TB is 0 bit.

If the bit length of $1^{st}$ bit field to the bit field that derives number of TBs in the DCI for single TB and two TB cases is different, padding bits is added to ensure the bit length is the same.

In another embodiment, UE is configured with at least one TDRA row with more than one SLIVs, and UE is configured with maxNrofCodeWordsScheduledByDCI=2. UE determines the number of PDSCHs scheduled by a DCI according to the number of SLIVs or number of valid SLIVs in the indicated row of TDRA table. UE determines the number of TBs scheduled by a DCI according to at least one of the indicated antenna ports, rank, layer, MSC, RV and number of PDSCHs.

In one example, if Ns the number of PDSCHs scheduled by a DCI is larger than $N_{1\_2TB}$, UE interprets the sequence of fields for transport block X of MCS, NDI, and RV as providing the indication of NDI and RV for a sub-set of scheduled PDSCHs. The transport block X is pre-defined, e.g., it is transport block 2.

In another example, if Ns the number of PDSCHs scheduled by a DCI is larger than $N_{1\_2TB}$, UE assumes the bit length for NDI and RV for $1^{st}$ TB is determined based on the maximum number of schedulable PDSCHs among all rows in TDRA. Each bit corresponds to one scheduled PDSCH. UE assumes the bit length of the bit field for $2^{nd}$ TB is 0 bit. If Ns the number of PDSCHs scheduled by a DCI is no larger than $N_{1\_2TB}$, UE assumes the bit length for NDI and RV for $1^{st}$ TB is determined based on the maximum number of schedulable PDSCHs among all rows in TDRA and $N_{1\_2TB}$, or UE assumes the bit length for NDI and RV for $1^{st}$ TB is determined based on $N_{1\_2TB}$. If gNB schedules single TB, UE determines MCS, NDI and RV for the single TB for each PDSCH according to be MCS, NDI and RV of the bit field of the TB. If gNB schedules two TBs, UE determines MCS, NDI and RV for each TB for each PDSCH according to be MCS, NDI and RV of the bit field of each TB respectively.

Systems and Implementations

Figure 11:
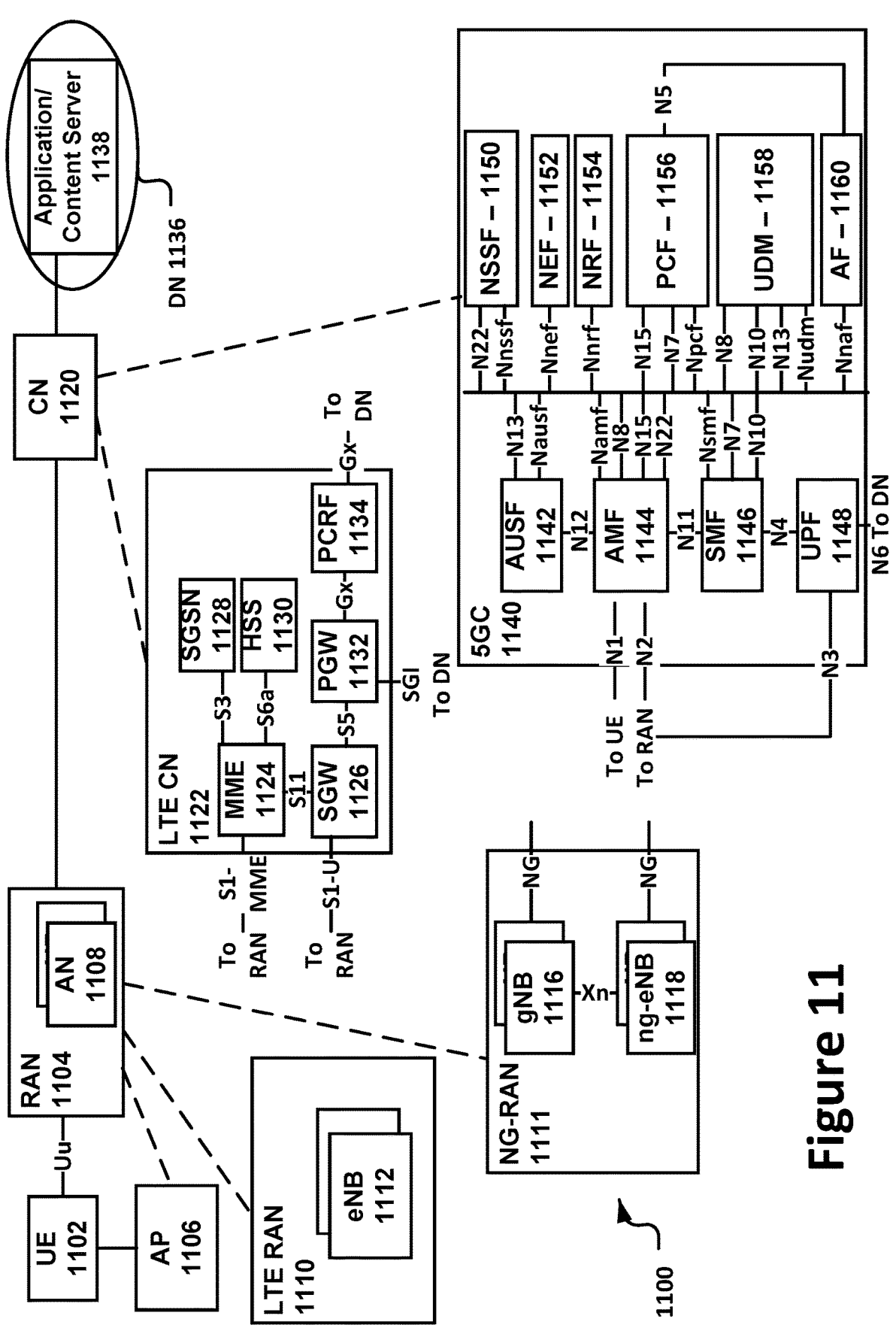
FIG. 11 schematically illustrates a wireless network in accordance with various embodiments.
Figure 12:
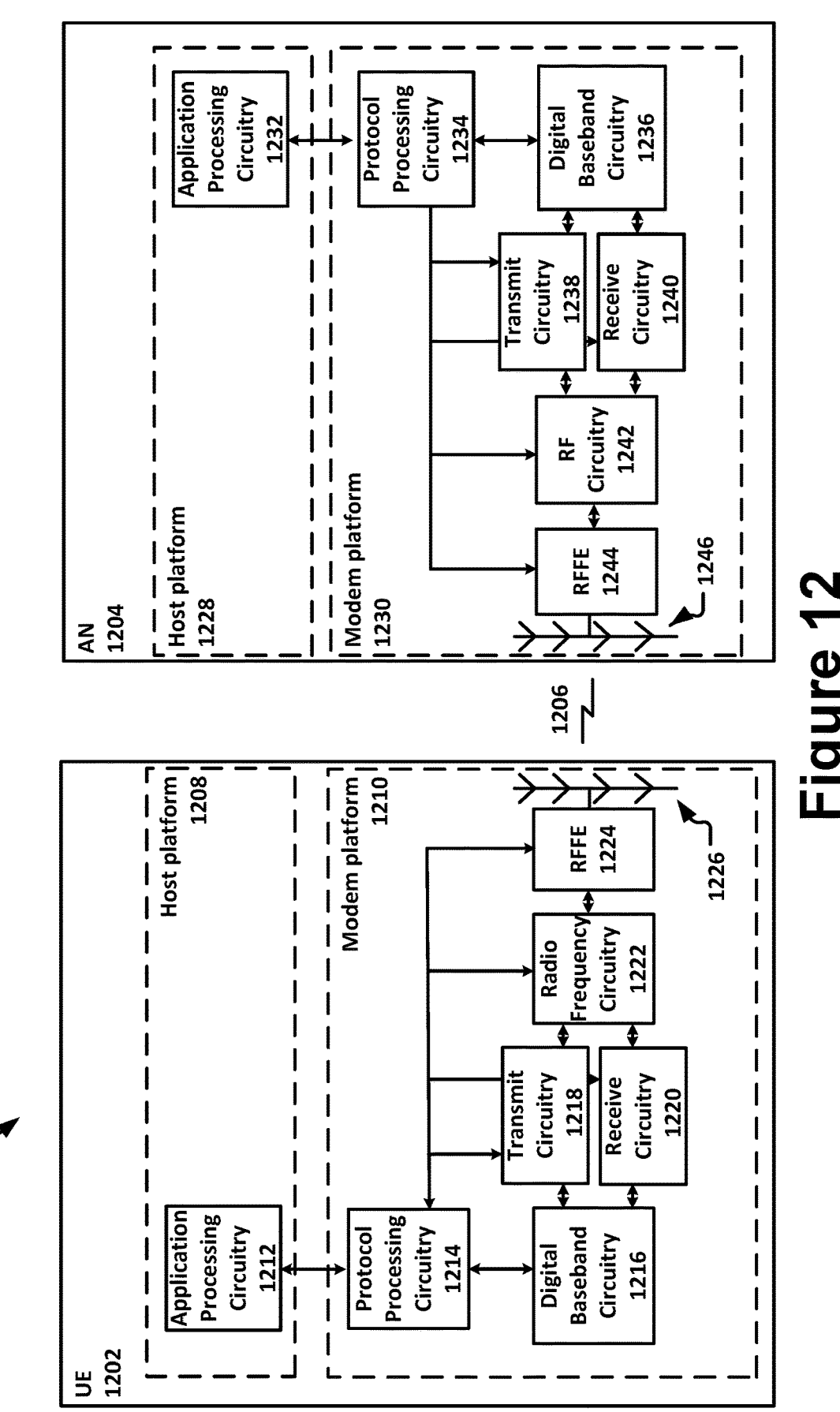
FIG. 12 schematically illustrates components of a wireless network in accordance with various embodiments.
Figure 13:
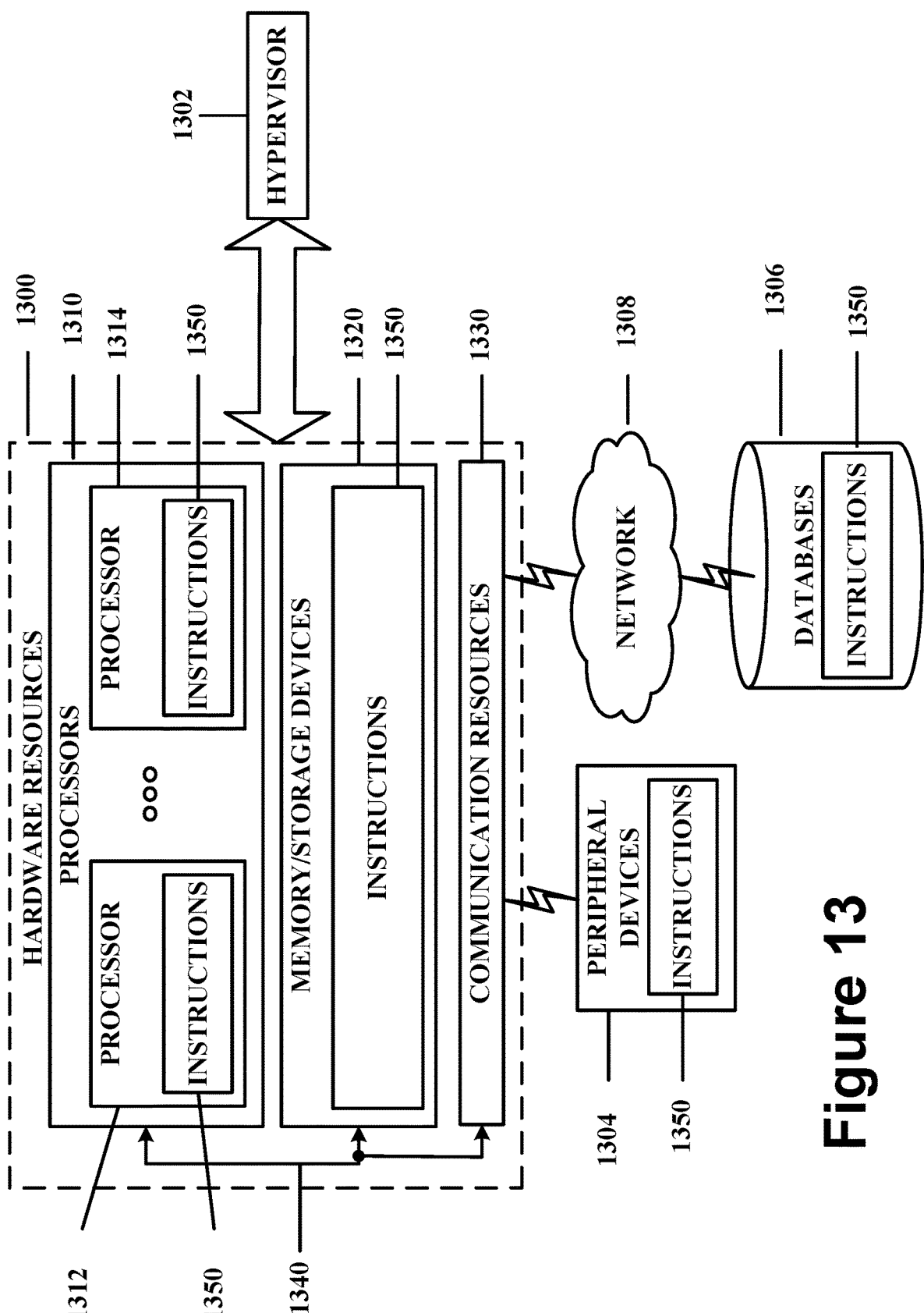
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 11-13 illustrate various systems, devices, and components that may implement aspects of disclosed embodiments.

FIG. 11 illustrates a network 1100 in accordance with various embodiments. The network 1100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1100 may include a UE 1102, which may include any mobile or non-mobile computing device designed to communicate with a RAN 1104 via an over-the-air connection. The UE 1102 may be communicatively coupled with the RAN 1104 by a Uu interface. The UE 1102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1100 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1102 may additionally communicate with an AP 1106 via an over-the-air connection. The AP 1106 may manage a WLAN connection, which may serve to offload some/all network traffic from the RAN 1104. The connection between the UE 1102 and the AP 1106 may be consistent with any IEEE 802.11 protocol, wherein the AP 1106 could be a wireless fidelity (Wi-Fi®) router. In some embodiments, the UE 1102, RAN 1104, and AP 1106 may utilize cellular-WLAN aggregation (for example, LWA/LWIP). Cellular-WLAN aggregation may involve the UE 1102 being configured by the RAN 1104 to utilize both cellular radio resources and WLAN resources.

The RAN 1104 may include one or more access nodes, for example, AN 1108. AN 1108 may terminate air-interface protocols for the UE 1102 by providing access stratum protocols including RRC, PDCP, RLC, MAC, and L1 protocols. In this manner, the AN 1108 may enable data/voice connectivity between CN 1120 and the UE 1102. In some embodiments, the AN 1108 may be implemented in a discrete device or as one or more software entities running on server computers as part of, for example, a virtual network, which may be referred to as a CRAN or virtual baseband unit pool. The AN 1108 be referred to as a BS, gNB, RAN node, eNB, ng-eNB, NodeB, RSU, TRxP, TRP, etc. The AN 1108 may be a macrocell base station or a low power base station for providing femtocells, picocells or other like cells having smaller coverage areas, smaller user capacity, or higher bandwidth compared to macrocells.

In embodiments in which the RAN 1104 includes a plurality of ANs, they may be coupled with one another via an X2 interface (if the RAN 1104 is an LTE RAN) or an Xn interface (if the RAN 1104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1104 may each manage one or more cells, cell groups, component carriers, etc. to provide the UE 1102 with an air interface for network access. The UE 1102 may be simultaneously connected with a plurality of cells provided by the same or different ANs of the RAN 1104. For example, the UE 1102 and RAN 1104 may use carrier aggregation to allow the UE 1102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1102 or AN 1108 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1104 may be an LTE RAN 1110 with eNBs, for example, eNB 1112. The LTE RAN 1110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1104 may be an NG-RAN 1114 with gNBs, for example, gNB 1116, or ng-eNBs, for example, ng-eNB 1118. The gNB 1116 may connect with 5G-enabled UEs using a 5G NR interface. The gNB 1116 may connect with a 5G core through an NG interface, which may include an N2 interface or an N3 interface. The ng-eNB 1118 may also connect with the 5G core through an NG interface, but may connect with a UE via an LTE air interface. The gNB 1116 and the ng-eNB 1118 may connect with each other over an Xn interface.

In some embodiments, the NG interface may be split into two parts, an NG user plane (NG-U) interface, which carries traffic data between the nodes of the NG-RAN 1114 and a UPF 1148 (e.g., N3 interface), and an NG control plane (NG-C) interface, which is a signaling interface between the nodes of the NG-RAN 1114 and an AMF 1144 (e.g., N2 interface).

The NG-RAN 1114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FRI bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1102 can be configured with multiple BWPs where each BWP configuration has a different SCS. When a BWP change is indicated to the UE 1102, the SCS of the transmission is changed as well. Another use case example of BWP is related to power saving. In particular, multiple BWPs can be configured for the UE 1102 with different amount of frequency resources (for example, PRBs) to support data transmission under different traffic loading scenarios. A BWP containing a smaller number of PRBs can be used for data transmission with small traffic load while allowing power saving at the UE 1102 and in some cases at the gNB 1116. A BWP containing a larger number of PRBs can be used for scenarios with higher traffic load.

The RAN 1104 is communicatively coupled to CN 1120 that includes network elements to provide various functions to support data and telecommunications services to customers/subscribers (for example, users of UE 1102). The components of the CN 1120 may be implemented in one physical node or separate physical nodes. In some embodiments, NFV may be utilized to virtualize any or all of the functions provided by the network elements of the CN 1120 onto physical compute/storage resources in servers, switches, etc. A logical instantiation of the CN 1120 may be referred to as a network slice, and a logical instantiation of a portion of the CN 1120 may be referred to as a network sub-slice.

In some embodiments, the CN 1120 may be an LTE CN 1122, which may also be referred to as an EPC. The LTE CN 1122 may include MME 1124, SGW 1126, SGSN 1128, HSS 1130, PGW 1132, and PCRF 1134 coupled with one another over interfaces (or "reference points") as shown. Functions of the elements of the LTE CN 1122 may be briefly introduced as follows.

The MME 1124 may implement mobility management functions to track a current location of the UE 1102 to facilitate paging, bearer activation/deactivation, handovers, gateway selection, authentication, etc.

The SGW 1126 may terminate an S1 interface toward the RAN and route data packets between the RAN and the LTE CN 1122. The SGW 1126 may be a local mobility anchor point for inter-RAN node handovers and also may provide an anchor for inter-3GPP mobility. Other responsibilities may include lawful intercept, charging, and some policy enforcement.

The SGSN 1128 may track a location of the UE 1102 and perform security functions and access control. In addition, the SGSN 1128 may perform inter-EPC node signaling for mobility between different RAT networks; PDN and S-GW selection as specified by MME 1124; MME selection for handovers; etc. The S3 reference point between the MME 1124 and the SGSN 1128 may enable user and bearer information exchange for inter-3GPP access network mobility in idle/active states.

The HSS 1130 may include a database for network users, including subscription-related information to support the network entities' handling of communication sessions. The HSS 1130 can provide support for routing/roaming, authentication, authorization, naming/addressing resolution, location dependencies, etc. An S6a reference point between the HSS 1130 and the MME 1124 may enable transfer of subscription and authentication data for authenticating/authorizing user access to the LTE CN 1120.

The PGW 1132 may terminate an SGi interface toward a data network (DN) 1136 that may include an application/content server 1138. The PGW 1132 may route data packets between the LTE CN 1122 and the data network 1136. The PGW 1132 may be coupled with the SGW 1126 by an S5 reference point to facilitate user plane tunneling and tunnel management. The PGW 1132 may further include anode for policy enforcement and charging data collection (for example, PCEF). Additionally, the SGi reference point between the PGW 1132 and the data network 1136 may be an operator external public, a private PDN, or an intra-operator packet data network, for example, for provision of IMS services. The PGW 1132 may be coupled with a PCRF 1134 via a Gx reference point.

The PCRF 1134 is the policy and charging control element of the LTE CN 1122. The PCRF 1134 may be communicatively coupled to the app/content server 1138 to determine appropriate QoS and charging parameters for service flows. The PCRF 1132 may provision associated rules into a PCEF (via Gx reference point) with appropriate TFT and QCI.

In some embodiments, the CN 1120 may be a 5GC 1140. The 5GC 1140 may include an AUSF 1142, AMF 1144, SMF 1146, UPF 1148, NSSF 1150, NEF 1152, NRF 1154, PCF 1156, UDM 1158, and AF 1160 coupled with one another over interfaces (or "reference points") as shown. Functions of the elements of the 5GC 1140 may be briefly introduced as follows.

The AUSF 1142 may store data for authentication of UE 1102 and handle authentication-related functionality. The AUSF 1142 may facilitate a common authentication framework for various access types. In addition to communicating with other elements of the 5GC 1140 over reference points as shown, the AUSF 1142 may exhibit an Nausf service-based interface.

The AMF 1144 may allow other functions of the 5GC 1140 to communicate with the UE 1102 and the RAN 1104 and to subscribe to notifications about mobility events with respect to the UE 1102. The AMF 1144 may be responsible for registration management (for example, for registering UE 1102), connection management, reachability management, mobility management, lawful interception of AMF-related events, and access authentication and authorization. The AMF 1144 may provide transport for SM messages between the UE 1102 and the SMF 1146, and act as a transparent proxy for routing SM messages. AMF 1144 may also provide transport for SMS messages between UE 1102 and an SMSF. AMF 1144 may interact with the AUSF 1142 and the UE 1102 to perform various security anchor and context management functions. Furthermore, AMF 1144 may be a termination point of a RAN CP interface, which may include or be an N2 reference point between the RAN 1104 and the AMF 1144; and the AMF 1144 may be a termination point of NAS (N1) signaling, and perform NAS ciphering and integrity protection. AMF 1144 may also support NAS signaling with the UE 1102 over an N3 IWF interface.

The SMF 1146 may be responsible for SM (for example, session establishment, tunnel management between UPF 1148 and AN 1108); UE IP address allocation and management (including optional authorization); selection and control of UP function; configuring traffic steering at UPF 1148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1144 over N2 to AN 1108; and determining SSC mode of a session. SM may refer to management of a PDU session, and a PDU session or "session" may refer to a PDU connectivity service that provides or enables the exchange of PDUs between the UE 1102 and the data network 1136.

The UPF 1148 may act as an anchor point for intra-RAT and inter-RAT mobility, an external PDU session point of interconnect to data network 1136, and a branching point to support multi-homed PDU session. The UPF 1148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1148 may include an uplink classifier to support routing traffic flows to a data network.

The NSSF 1150 may select a set of network slice instances serving the UE 1102. The NSSF 1150 may also determine allowed NSSAI and the mapping to the subscribed S-NSSAIs, if needed. The NSSF 1150 may also determine the AMF set to be used to serve the UE 1102, or a list of candidate AMFs based on a suitable configuration and possibly by querying the NRF 1154. The selection of a set of network slice instances for the UE 1102 may be triggered by the AMF 1144 with which the UE 1102 is registered by interacting with the NSSF 1150, which may lead to a change of AMF. The NSSF 1150 may interact with the AMF 1144 via an N22 reference point; and may communicate with another NSSF in a visited network via an N31 reference point (not shown). Additionally, the NSSF 1150 may exhibit an Nnssf service-based interface.

The NEF 1152 may securely expose services and capabilities provided by 3GPP network functions for third party, internal exposure/re-exposure, AFs (e.g., AF 1160), edge computing or fog computing systems, etc. In such embodiments, the NEF 1152 may authenticate, authorize, or throttle the AFs. NEF 1152 may also translate information exchanged with the AF 1160 and information exchanged with internal network functions. For example, the NEF 1152 may translate between an AF-Service-Identifier and an internal 5GC information. NEF 1152 may also receive information from other NFs based on exposed capabilities of other NFs. This information may be stored at the NEF 1152 as structured data, or at a data storage NF using standardized interfaces. The stored information can then be re-exposed by the NEF 1152 to other NFs and AFs, or used for other purposes such as analytics. Additionally, the NEF 1152 may exhibit an Nnef service-based interface.

The NRF 1154 may support service discovery functions, receive NF discovery requests from NF instances, and provide the information of the discovered NF instances to the NF instances. NRF 1154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1154 may exhibit the Nnrf service-based interface.

The PCF 1156 may provide policy rules to control plane functions to enforce them, and may also support unified policy framework to govern network behavior. The PCF 1156 may also implement a front end to access subscription information relevant for policy decisions in a UDR of the UDM 1158. In addition to communicating with functions over reference points as shown, the PCF 1156 exhibit an Npcf service-based interface.

The UDM 1158 may handle subscription-related information to support the network entities' handling of communication sessions, and may store subscription data of UE 1102. For example, subscription data may be communicated via an N8 reference point between the UDM 1158 and the AMF 1144. The UDM 1158 may include two parts, an application front end and a UDR. The UDR may store subscription data and policy data for the UDM 1158 and the PCF 1156, and/or structured data for exposure and application data (including PFDs for application detection, application request information for multiple UEs 1102) for the NEF 1152. The Nudr service-based interface may be exhibited by the UDR 221 to allow the UDM 1158, PCF 1156, and NEF 1152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1158 may exhibit the Nudm service-based interface.

The AF 1160 may provide application influence on traffic routing, provide access to NEF, and interact with the policy framework for policy control.

In some embodiments, the 5GC 1140 may enable edge computing by selecting operator/3$^{rd}$ party services to be geographically close to a point that the UE 1102 is attached to the network. This may reduce latency and load on the network. To provide edge-computing implementations, the 5GC 1140 may select a UPF 1148 close to the UE 1102 and execute traffic steering from the UPF 1148 to data network 1136 via the N6 interface. This may be based on the UE subscription data, UE location, and information provided by the AF 1160. In this way, the AF 1160 may influence UPF (re)selection and traffic routing. Based on operator deployment, when AF 1160 is considered to be a trusted entity, the network operator may permit AF 1160 to interact directly with relevant NFs. Additionally, the AF 1160 may exhibit an Naf service-based interface.

The data network 1136 may represent various network operator services, Internet access, or third party services that may be provided by one or more servers including, for example, application/content server 1138.

FIG. 12 schematically illustrates a wireless network 1200 in accordance with various embodiments. The wireless network 1200 may include a UE 1202 in wireless communication with an AN 1204. The UE 1202 and AN 1204 may be similar to, and substantially interchangeable with, like-named components described elsewhere herein.

The UE 1202 may be communicatively coupled with the AN 1204 via connection 1206. The connection 1206 is illustrated as an air interface to enable communicative coupling, and can be consistent with cellular communications protocols such as an LTE protocol or a 5G NR protocol operating at mmWave or sub-6 GHz frequencies.

The UE 1202 may include a host platform 1208 coupled with a modem platform 1210. The host platform 1208 may include application processing circuitry 1212, which may be coupled with protocol processing circuitry 1214 of the modem platform 1210. The application processing circuitry 1212 may run various applications for the UE 1202 that source/sink application data. The application processing circuitry 1212 may further implement one or more layer operations to transmit/receive application data to/from a data network. These layer operations may include transport (for example UDP) and Internet (for example, IP) operations The protocol processing circuitry 1214 may implement one or more of layer operations to facilitate transmission or reception of data over the connection 1206. The layer operations implemented by the protocol processing circuitry 1214 may include, for example, MAC, RLC, PDCP, RRC and NAS operations.

The modem platform 1210 may further include digital baseband circuitry 1216 that may implement one or more layer operations that are "below" layer operations performed by the protocol processing circuitry 1214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1210 may further include transmit circuitry 1218, receive circuitry 1220, RF circuitry 1222, and RF front end (RFFE) 1224, which may include or connect to one or more antenna panels 1226. Briefly, the transmit circuitry 1218 may include a digital-to-analog converter, mixer, intermediate frequency (IF) components, etc.; the receive circuitry 1220 may include an analog-to-digital converter, mixer, IF components, etc.; the RF circuitry 1222 may include a low-noise amplifier, a power amplifier, power tracking components, etc.; RFFE 1224 may include filters (for example, surface/bulk acoustic wave filters), switches, antenna tuners, beamforming components (for example, phase-array antenna components), etc. The selection and arrangement of the components of the transmit circuitry 1218, receive circuitry 1220, RF circuitry 1222, RFFE 1224, and antenna panels 1226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1214 may include one or more instances of control circuitry (not shown) to provide control functions for the transmit/receive components.

A UE reception may be established by and via the antenna panels 1226, RFFE 1224, RF circuitry 1222, receive circuitry 1220, digital baseband circuitry 1216, and protocol processing circuitry 1214. In some embodiments, the antenna panels 1226 may receive a transmission from the AN 1204 by receive-beamforming signals received by a plurality of antennas/antenna elements of the one or more antenna panels 1226.

A UE transmission may be established by and via the protocol processing circuitry 1214, digital baseband circuitry 1216, transmit circuitry 1218, RF circuitry 1222, RFFE 1224, and antenna panels 1226. In some embodiments, the transmit components of the UE 1204 may apply a spatial filter to the data to be transmitted to form a transmit beam emitted by the antenna elements of the antenna panels 1226.

Similar to the UE 1202, the AN 1204 may include a host platform 1228 coupled with a modem platform 1230. The host platform 1228 may include application processing circuitry 1232 coupled with protocol processing circuitry 1234 of the modem platform 1230. The modem platform may further include digital baseband circuitry 1236, transmit circuitry 1238, receive circuitry 1240, RF circuitry 1242, RFFE circuitry 1244, and antenna panels 1246. The components of the AN 1204 may be similar to and substantially interchangeable with like-named components of the UE 1202. In addition to performing data transmission/reception as described above, the components of the AN 1208 may perform various logical functions that include, for example, RNC functions such as radio bearer management, uplink and downlink dynamic radio resource management, and data packet scheduling.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340 or other interface circuitry. For embodiments where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processors 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface controllers, components, or other suitable devices to communicate with one or more peripheral devices 1304 or one or more databases 1306 or other network elements via a network 1308. For example, the communication resources 1330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

Example Procedures

In some embodiments, the electronic device(s), network(s), system(s), chip(s) or component(s), or portions or implementations thereof, of FIGS. 11-13, or some other figure herein, may be configured to perform one or more processes, techniques, or methods as described herein, or portions thereof. One such process 1400 is depicted in FIG. 14. In some embodiments, the process 1400 may be performed by a UE or a portion thereof. At 1402, the process 1400 may include decoding a downlink control information (DCI) to schedule multiple transmissions, including a first transmission, a second transmission after the first transmission, and a third transmission after the second transmission, wherein the first transmission has a first hybrid automatic repeat request (HARQ) process identifier (ID). The first, second, and third transmissions may be physical uplink shared channel (PUSCH) transmissions, physical downlink shared channel transmissions (PDSCHs), and/or another suitable type of transmission.

At 1404, the process 1400 may further include identifying that the second transmission will be dropped. For example, the second transmission may be dropped based on a conflict with a UL-DL configuration, e.g., a collision with flexible symbols that are used for synchronization signal block (SSB) transmission. For example, in some embodiments, the UE may receive a ssb-PositionsInBurst in a synchronization information block 1 (SIB1) or a ssb-PositionsInBurst in a ServingCellConfigCommon that indicates a synchronization signal/physical broadcast channel (SS/PBCH) block index, determine that the SS/PBCH block index corresponds to a candidate SS/PBCH block index of a set of symbols of a SS/PBCH block, and identify the collision based on the determination.

At 1406, the process 1400 may further include determining, based on the identification, a second HARQ process ID for the third transmission, wherein the second HARQ process ID is incremented by one from the first HARQ process ID. Accordingly, the second transmission may be skipped when allocating the HARQ process IDs. In some embodiments, the second HARQ process ID may be used for the third transmission only for certain types of collisions or other reasons the second transmission is dropped.

FIG. 15 illustrates another process 1500 in accordance with various embodiments. The process 1500 may be performed by a gNB or a portion thereof. At 1502, the process 1500 may include encoding, for transmission to a user equipment (UE), a downlink control information (DCI) to schedule multiple transmissions, including a first transmission, a second transmission after the first transmission, and a third transmission after the second transmission, wherein the first transmission has a first hybrid automatic repeat request (HARQ) process identifier (ID). The first, second, and third transmissions may be physical uplink shared channel (PUSCH) transmissions, physical downlink shared channel transmissions (PDSCHs), and/or another suitable type of transmission.

At 1504, the process 1500 may further include identifying that the second transmission will be dropped. For example, the second transmission may be dropped based on a conflict with a UL-DL configuration, e.g., a collision with flexible symbols that are used for synchronization signal block (SSB) transmission. For example, in some embodiments, the gNB may send the UE a ssb-PositionsInBurst in a synchronization information block 1 (SIB1) or a ssb-PositionsInBurst in a ServingCellConfigCommon that indicates a synchronization signal/physical broadcast channel (SS/PBCH) block index, and the collision may be identified based on a determination that the SS/PBCH block index corresponds to a candidate SS/PBCH block index of a set of symbols of a SS/PBCH block.

At 1506, the process 1500 may further include determining, based on the identification, a second HARQ process ID for the third transmission, wherein the second HARQ process ID is incremented by one from the first HARQ process ID. Accordingly, the second transmission may be skipped when allocating the HARQ process IDs. In some embodiments, the second HARQ process ID may be used for the third transmission only for certain types of collisions or other reasons the second transmission is dropped.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example A1 may include one or more computer-readable media having instructions, stored thereon, that when executed by one or more processors of a user equipment (UE) cause the UE to:

decode a downlink control information (DCI) to schedule multiple transmissions, including a first transmission, a second transmission after the first transmission, and a third transmission after the second transmission, wherein the first transmission has a first hybrid automatic repeat request (HARQ) process identifier (ID);
  identify that the second transmission will be dropped; and
  determine, based on the identification, a second HARQ process ID for the third transmission, wherein the second HARQ process ID is incremented by one from the first HARQ process ID.

Example A2 may include the one or more computer-readable media of example A1, wherein the first, second, and third transmissions are first, second, and third physical uplink shared channel (PUSCH) transmissions, respectively, and wherein the instructions, when executed, are further to cause the UE to encode the third PUSCH transmission for transmission based on the second HARQ process ID.

Example A3 may include the one or more computer-readable media of example A2, wherein the second transmission is dropped due to a collision with flexible symbols used for synchronization signal block (SSB) transmission.

Example A4 may include the one or more computer-readable media of example A3, wherein the instructions, when executed, are further to cause the UE to receive a semi-static uplink-downlink (UL-DL) configuration that indicates the flexible symbols.

Example A5 may include the one or more computer-readable media of example A3, wherein the instructions, when executed, are further to cause the UE to:

receive a ssb-PositionsInBurst in a system information block 1 (SIB1) or a ssb-PositionsInBurst in a ServingCellConfigCommon that indicates a synchronization signal/physical broadcast channel (SS/PBCH) block index;
  determine that a set of symbols corresponds to the SS/PBCH block index; and
  identify the collision based on the determination.

Example A6 may include the one or more computer-readable media of example A2, wherein the identification that the second transmission will be dropped is based on a determination that at least one symbol indicated by an indexed row of a resource allocation table used for the second PUSCH transmission overlaps with a downlink symbol indicated by a time-domain-duplexing (TDD) uplink-downlink (UL-DL) common configuration, a downlink symbol indicated by a TDD UL-DL dedicated configuration, or a symbol of a synchronization signal/physical broadcast channel (SS/PBCH) block with an index provided by ssb-PositionsInBurst.

Example A7 may include the one or more computer-readable media of example A1, wherein the second transmission is dropped due to a collision with an uplink/downlink (UL/DL) direction of a corresponding symbol or slot.

Example A8 may include one or more computer-readable media having instructions, stored thereon, that when executed by one or more processors of a next generation Node B (gNB) cause the gNB to:

encode, for transmission to a user equipment (UE), a downlink control information (DCI) to schedule multiple transmissions, including a first transmission, a second transmission after the first transmission, and a third transmission after the second transmission, wherein the first transmission has a first hybrid automatic repeat request (HARQ) process identifier (ID);
  identify that the second transmission will be dropped; and
  determine, based on the identification, a second HARQ process ID for the third transmission, wherein the second HARQ process ID is incremented by one from the first HARQ process ID.

Example A9 may include the one or more computer-readable media of example A8, wherein the first, second, and third transmissions are first, second, and third physical uplink shared channel (PUSCH) transmissions, respectively, and wherein the instructions, when executed, are further to cause the gNB to provide HARQ feedback for the third PUSCH based on the second HARQ process ID.

Example A10 may include the one or more computer-readable media of example A9, wherein the second transmission is dropped due to a collision with flexible symbols used for synchronization signal block (SSB) transmission.

Example A11 may include the one or more computer-readable media of example A10, wherein the instructions, when executed, are further to cause the gNB to encode, for transmission to the UE, a semi-static uplink-downlink (UL-DL) configuration that indicates the flexible symbols.

Example A12 may include the one or more computer-readable media of example A10, wherein the instructions, when executed, are further to cause the gNB to encode, for transmission to the UE, a ssb-PositionsInBurst in a system information block 1 (SIB1) or a ssb-PositionsInBurst in a ServingCellConfigCommon that indicates a synchronization signal/physical broadcast channel (SS/PBCH) block index, wherein the collision is identified based on a determination that a set of symbols correspond to the SS/PBCH block index.

Example A13 may include the one or more computer-readable media of example A9, wherein the identification that the second transmission will be dropped is based on a determination that at least one symbol indicated by an indexed row of a resource allocation table used for the second PUSCH transmission overlaps with a downlink symbol indicated by a time-domain-duplexing (TDD) uplink-downlink (UL-DL) common configuration, a downlink symbol indicated by a TDD UL-DL dedicated configuration, or a symbol of a synchronization signal/physical broadcast channel (SS/PBCH) block with an index provided by ssb-PositionsInBurst.

Example A14 may include the one or more computer-readable media of example A9, wherein the second transmission is dropped due to a collision with an uplink/downlink (UL/DL) direction of a corresponding symbol or slot.

Example A15 may include an apparatus to be implemented in a user equipment (UE), the apparatus comprising:

a memory to store a semi-static uplink-downlink (UL-DL) configuration; and processor circuitry coupled to the memory, the processor circuitry to:

decode a downlink control information (DCI) to schedule a first physical uplink shared channel (PUSCH) and a second PUSCH after the first PUSCH, wherein the first PUSCH is associated with a first hybrid automatic repeat request (HARQ) process identifier (ID);

identify that the first PUSCH will be dropped due to a collision based on the UL-DL configuration; and encode, based on the identification, the second PUSCH for transmission using the first HARQ process ID.

Example A16 may include the apparatus of example A15, wherein the first transmission is dropped due to a collision with flexible symbols of the UL-DL configuration that are used for synchronization signal block (SSB) transmission.

Example A17 may include the apparatus of example A15, wherein the processor circuitry is further to:

receive a ssb-PositionsInBurst in a system information block 1 (SIB1) or a ssb-PositionsInBurst in a Serving-CellConfigCommon that indicates a synchronization signal/physical broadcast channel (SS/PBCH) block index;

determine that a set of symbols correspond to the SS/PBCH block; and identify the collision based on the determination.

Example A18 may include the apparatus of example A15, wherein the identification that the first transmission will be dropped is based on a determination that at least one symbol indicated by an indexed row of a resource allocation table used for the first PUSCH transmission overlaps with a downlink symbol indicated by the UL-DL configuration.

Example A19 may include the apparatus of example A18, wherein the UL-DL configuration is a time-domain duplexing (TDD) UL-DL common configuration or a TDD UL-DL dedicated configuration.

Example A20 may include the apparatus of example A15, wherein the first PUSCH is dropped due to a collision with a UL-DL direction of the UL-DL configuration in a corresponding symbol or slot or a symbol of a synchronization signal/physical broadcast channel (SS/PBCH) block with an index provided by ssb-PositionsInBurst.

Example A21 may include the apparatus of any of examples A15-A20, wherein the first HARQ process ID is incremented by one from a second HARQ process ID used for a third PUSCH that was a last PUSCH transmitted prior to the second PUSCH.

Example A22 may include the apparatus of example A21, wherein the third PUSCH is scheduled by the DCI or another DCI.

Example B1 may include a method of wireless communication for PDSCH reception or PUSCH transmission, if one or multiple PDSCHs or PUSCHs is scheduled by a downlink control information (DCI):

decoding, by a UE, a DCI from physical downlink control channel (PDCCH);

determining, by the UE, a HARQ process ID for the PDSCH or PUSCH; and receiving, by the UE, the PDSCH, or, transmitting, by the UE, the PUSCH.

Example B2 may include the method of example B1 or some other example herein, when a scheduled PUSCH transmission is dropped due to collision with flexible symbols which are configured by semi-static UL/DL configuration, e.g., tdd-UL-DL-ConfigurationCommon or tdd-UL- DL-ConfigurationDedicated, and used for SSB transmission, then HARQ process ID increment is skipped for the PUSCH and applied for valid PUSCHs.

Example B3 may include the method of example B1 or some other example herein, when a scheduled PUSCH transmission is dropped due to collision with flexible symbols which are configured by semi-static UL/DL configuration, e.g., tdd-UL-DL-ConfigurationCommon or tdd-UL-DL-ConfigurationDedicated and with CORESET0 with Type0-PDCCH CSS set and/or invalid UL symbols for DL-to-UL switching, HARQ process ID increment is skipped for the PUSCH and applied for valid PUSCHs Example B4 may include the method of example B1 or some other example herein, when a scheduled PUSCH transmission is dropped due to collision with flexible symbols which are configured by semi-static UL/DL configuration, e.g., tdd-UL-DL-ConfigurationCommon or tdd-UL-DL-ConfigurationDedicated and with SSB transmission, CORESET0 with Type0-PDCCH CSS set and invalid UL symbols for DL-to-UL switching, HARQ process ID increment is still continued and not skipped for the PUSCH and applied for valid PUSCHs Example B5 may include the method of example B1 or some other example herein, when a scheduled PUSCH transmission is dropped due to collision with invalid UL symbols for DL-to-UL switching after the last symbol that is indicated as downlink in each consecutive set of all symbols that are indicated as downlink by tdd-UL-DL-ConfigurationCommon or tdd-UL-DL-ConfigurationDedicated, HARQ process ID increment is skipped for the PUSCH and applied for valid PUSCHs Example B6 may include the method of example B1 or some other example herein, wherein when if a scheduled PDSCH/PUSCH is dropped due to collision with UL/DL direction as indicated by dynamic SFI in the DCI format 2_0, UL cancellation indication, or higher priority transmission, etc., HARQ process ID increment is skipped.

Example B7 may include the method of example B1 or some other example herein, when if a scheduled PDSCH/PUSCH is dropped due to collision with UL/DL direction as indicated by dynamic SFI in the DCI format 2_0, UL cancellation indication, or higher priority transmission, etc., HARQ process ID increment is still continued and not skipped.

Example B8 may include the method of example B1 or some other example herein, when if a scheduled PDSCH/PUSCH is dropped due to collision with the idle period of a Fixed Frame Period (FFP), HARQ process ID increment is skipped for the PUSCH and applied for valid PUSCHs.

Example B9 may include the method of example B1 or some other example herein, wherein if a scheduled PDSCH/PUSCH is dropped due to collision with the idle period of a Fixed Frame Period (FFP), HARQ process ID increment is still continued and not skipped.

Example B10 may include the method of example B1 or some other example herein, wherein the HARQ process ID of the PDSCH is incremented by 1, if the HARQ process ID equals to a HARQ process ID of a Semi-persistent scheduling (SPS) PDSCH, or, the HARQ process ID of the PUSCH is incremented by 1, if the HARQ process ID equals to a HARQ process ID of a configured grant (CG) PUSCH.

Example B11 may include the method of example B1 or some other example herein, wherein the UE does not receive the PDSCH, if the HARQ process ID of the PDSCH equals to a HARQ process ID of a SPS PDSCH, or, the UE does not transmit the PUSCH, if the HARQ process ID of the PUSCH equals to a HARQ process ID of a CG PUSCH.

Example B12 may include the method of example B10 or example 11 or some other example herein, the HARQ process ID of the SPS PDSCH is HARQ process IDs for all configured SPS PDSCHs, or the HARQ process ID of the SPS PDSCH is HARQ process IDs for all activated SPS PDSCHs, or the HARQ process ID of the CG PUSCH is HARQ process IDs for all configured CG PUSCHs, or the HARQ process ID of the CG PUSCH is HARQ process IDs for all activated CG PUSCHs.

Example B13 may include the method of example B10 or example B11 or some other example herein, wherein the HARQ process ID of the SPS PDSCH is HARQ process IDs for valid SPS PDSCHs which currently occupy the HARQ process ID, or, the HARQ process ID of the CG PUSCH is HARQ process IDs for valid CG PUSCHs which currently occupy the HARQ process ID.

Example B14 may include the method of example B13 or some other example herein, wherein the valid SPS PDSCH is activated SPS PDSCH, or, activated and un-cancelled SPS PDSCH, or activated and un-cancelled by semi-static signals SPS PDSCH, or, the valid CG PUSCH is activated CG PUSCH, or, activated and un-cancelled CG PUSCH, or activated and un-cancelled by semi-static signals CG PUSCH.

Example B15 may include the method of example B13 or some other example herein, wherein if the timeline between the SPS PDSCH and a PDCCH scheduling the PDSCH is not met, the HARQ process ID is considered as currently occupied by the SPS PDSCH, or, if the timeline between the SPS PDSCH and a PUCCH carrying HARQ-ACK for the PDSCH is not met, the HARQ process ID is considered as currently occupied by the SPS PDSCH, or, if the timeline between the CG PUSCH and a PDCCH scheduling the PUSCH is not met, the HARQ process ID is considered as currently occupied by the CG PUSCH.

Example B16 may include the method of example B1 or some other example herein, wherein time bundling is applied to reduce the size of Type3 HARQ-ACK codebook.

Example B17 may include the method of example B16 or some other example herein, wherein the total number of bundled HARQ-ACK bits for a serving cell is $\lceil M_{max}/X \rceil$, where $M_{max}$ is maximum number of HARQ processes, X is the number of HARQ processes per bundled bit.

Example B18 may include the method of example B17 or some other example herein, wherein the $k^{th}$ bundled bit is generated by bundling the HARQ-ACK bits of HPs kX, kX+1, . . . , (k+1)X−1, k=0, 1, . . . , $\lceil M_{max}/X \rceil$−1.

Example B19 may include the method of example B17 or some other example herein, wherein the bundled HPs associated with a bundled bit is determined by the HPs that are scheduled by a DCI for multi-PDSCH scheduling.

Example B20 may include the method of example B19 or some other example herein, wherein the first bundled bit is bit $\lfloor n/X \rfloor$ or $mod(\lfloor n/X \rfloor + mod(n, X), \lceil M_{max}/X \rceil)$.

Example B21 may include the method of example B20 or some other example herein, wherein $k0=mod(\lfloor n/X \rfloor + s, \lceil M_{max}/X \rceil)$, s is indicated by the DCI.

Example 22 may include a method comprising:
receiving or transmitting a DCI to schedule multiple transmissions, including a first transmission, a second transmission after the first transmission, and a third transmission after the second transmission, wherein the first transmission has a first HARQ process ID;
identifying that the second transmission will be dropped; and
determining, based on the identification, a second HARQ process ID for the third transmission, wherein the second HARQ process ID is incremented by one from the first HARQ process ID.

Example B23 may include the method of example B22 or some other example herein, wherein the first, second, and third transmissions are PDSCHs or PUSCHs.

Example B24 may include the method of example B22-B23 or some other example herein, further comprising receiving the third transmission; and providing HARQ feedback for the third transmission using the determined HARQ process ID.

Example B25 may include the method of example B22-B23 or some other example herein, further comprising transmitting the third transmission; and receiving HARQ feedback for the third transmission based on the determined HARQ process ID.

Example B26 may include the method of example B22-B25 or some other example herein, wherein the second transmission is dropped due to collision with a UL-DL configuration.

Example B27 may include the method of example B26 or some other example herein, wherein the UL-DL configuration is a semi-static configuration indicated by tdd-UL-DL-ConfigurationCommon or tdd-UL-DL-ConfigurationDedicated.

Example B28 may include the method of example B22-B27 or some other example herein, wherein the second transmission is dropped due to flexible symbols used for SSB transmission.

Example B29 may include the method of example B22-B27 or some other example herein, wherein the first, second, and third transmissions are PUSCHs, and wherein the second PUSCH is dropped due to collision with flexible symbols and with CORESET0 with Type0-PDCCH CSS set and/or invalid UL symbols for DL-to-UL switching Example B30 may include the method of example B22-B27 or some other example herein, wherein the first, second, and third transmissions are PUSCHs, and wherein the second PUSCH is dropped due to collision with flexible symbols with SSB transmission, and CORESET0 with Type0-PDCCH CSS set and invalid UL symbols for DL-to-UL switching.

Example B31 may include the method of example B22-B27 or some other example herein, wherein the first, second, and third transmissions are PUSCHs, and wherein the second PUSCH is dropped due to collision with invalid UL symbols for DL-to-UL switching after the last symbol that is indicated as downlink in each consecutive set of all symbols that are indicated as downlink by the UL-DL configuration.

Example B32 may include the method of example B22-B27 or some other example herein, wherein the second transmission is dropped due to collision with UL/DL direction or a corresponding subframe.

Example B33 may include the method of example B32 or some other example herein, wherein the UL/DL direction is indicated by dynamic SFI in the DCI format 2_0, UL cancellation indication, or higher priority transmission.

Example B34 may include the method of example B22-B27 or some other example herein, wherein the second transmission is dropped due to collision with the idle period of a Fixed Frame Period (FFP).

Example B35 may include the method of example B22-B34 or some other example herein, wherein the method is performed by a UE or a portion thereof.

Example B36 may include the method of example B22-B34 or some other example herein, wherein the method is performed by a gNB or a portion thereof.

Example Z01 may include an apparatus comprising means to perform one or more elements of a method described in or related to any of examples A1-A22, B1-B36, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A22, B1-B36, or any other method or process described herein.

Example Z03 may include an apparatus comprising logic, modules, or circuitry to perform one or more elements of a method described in or related to any of examples A1-A22, B1-B36, or any other method or process described herein.

Example Z04 may include a method, technique, or process as described in or related to any of examples A1-A22, B1-B36, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A22, B1-B36, or portions thereof.

Example Z06 may include a signal as described in or related to any of examples A1-A22, B1-B36, or portions or parts thereof.

Example Z07 may include a datagram, packet, frame, segment, protocol data unit (PDU), or message as described in or related to any of examples A1-A22, B1-B36, or portions or parts thereof, or otherwise described in the present disclosure.

Example Z08 may include a signal encoded with data as described in or related to any of examples A1-A22, B1-B36, or portions or parts thereof, or otherwise described in the present disclosure.

Example Z09 may include a signal encoded with a datagram, packet, frame, segment, protocol data unit (PDU), or message as described in or related to any of examples A1-A22, B1-B36, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A22, B1-B36, or portions thereof.

Example Z11 may include a computer program comprising instructions, wherein execution of the program by a processing element is to cause the processing element to carry out the method, techniques, or process as described in or related to any of examples A1-A22, B1-B36, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital Expenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |

-continued

-continued

| | |
|---|---|
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink |

| | |
|---|---|
| | Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X F1AP F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity Network |
| GERAN | GSM EDGE RAN, GSM EDGE Radio Access |
| GGSN | Gateway GPRS Support Node |
| GLONASS | GLObal'naya NAvigatsionnay a Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |

| | |
|---|---|
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPV6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) MAC-IMAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |

| | |
|---|---|
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-POP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband PhysicalDownlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |

-continued

| | |
|---|---|
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resourc eElement Group |

-continued

| | |
|---|---|
| Rel | Release |
| REQ | REQuest |
| RF | Radio Frequency |
| RI | Rank Indicator |
| RIV | Resource indictator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| SIAP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |

| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block SSBRI SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |

| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VOIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | Expected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. A User Equipment (UE) configured for operation in a fifth-generation new radio (5G NR) network, the UE comprising: processing circuitry; and memory, the processing circuitry configured to:

decode a downlink control information (DCI) format scheduling multiple physical uplink shared channels (PUSCHs) on a serving cell;

apply a hybrid automatic repeat request (HARQ) process identifier (ID) indicated by the DCI format to a first of the scheduled multiple PUSCHs that is not overlapping with a downlink (DL) symbol indicated by tdd-UL-DL-ConfigurationCommon or tdd-UL-DL-ConfigurationDedicated if provided, or a symbol of an SS/PBCH block with an index provided by ssb-PositionsInBurst;

exclude one or more of the scheduled multiple PUSCHs from transmission if at least one symbol, indicated by an indexed row of a resource allocation table, in a slot overlaps with a DL symbol indicated by the tdd-UL-DL-ConfigurationCommon or the tdd-UL-DL-ConfigurationDedicated;

further exclude one or more of the scheduled PUSCHs from transmission if at least one symbol, indicated by the indexed row of the resource allocation table, in a slot overlaps with a symbol of the SS/PBCH block with the index provided by the ssb-PositionsInBurst;

configure the UE to transmit the scheduled multiple PUSCHs, that have not been excluded from transmission, in a scheduled order;

increment the HARQ process ID by one for each subsequent one of the multiple scheduled PUSCHs that is transmitted; and refrain from incrementing the HARQ process ID for any of the one or more of the multiple scheduled PUSCHs that are excluded from transmission.

2. The UE of claim 1, wherein the processing circuitry is further configured to:

decode a second DCI format scheduling multiple physical downlink shared channels (PDSCHs) on the serving cell;

apply a first HARQ process ID indicated by the second DCI format to a first PDSCH that is not overlapping with an uplink (UL) symbol indicated by the tdd-UL-DL-ConfigurationCommon or the tdd-UL-DL-ConfigurationDedicated, if provided;

decode one or more of the PDSCHs received in a scheduled order, wherein the first HARQ process ID is incremented by one for each subsequent PDSCH that is received in the scheduled order, and wherein the first HARQ process ID is not incremented for a PDSCH that is not received if at least one of the symbols, indicated by the indexed row of a resource allocation table, in a slot overlaps with a UL symbol indicated the by tdd-UL-DL-ConfigurationCommon or the tdd-UL-DL-ConfigurationDedicated, if provided.

* * * * *